US008144646B2

(12) United States Patent
Zha et al.

(10) Patent No.: US 8,144,646 B2
(45) Date of Patent: Mar. 27, 2012

(54) METHOD AND SYSTEM FOR INTERCONNECTING BROADBAND WIRELESS ACCESS NETWORK WITH OPTICAL ACCESS BROADBAND NETWORK

(75) Inventors: Min Zha, Shenzhen (CN); Ruobin Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 894 days.

(21) Appl. No.: 12/130,591

(22) Filed: May 30, 2008

(65) Prior Publication Data
US 2008/0298311 A1 Dec. 4, 2008

Related U.S. Application Data

(63) Continuation of application No. PCT/CN2006/003263, filed on Dec. 4, 2006.

(30) Foreign Application Priority Data

Dec. 2, 2005 (CN) .......................... 2005 1 0127443
Dec. 8, 2005 (CN) .......................... 2005 1 0130080
Dec. 14, 2005 (CN) .......................... 2005 1 0130532

(51) Int. Cl.
*H04W 4/00* (2009.01)
(52) U.S. Cl. ......... 370/328; 370/401; 370/389; 455/445
(58) Field of Classification Search .................. 370/328, 370/329, 338, 389, 401
See application file for complete search history.

(56) References Cited

U.S. PATENT DOCUMENTS

| | | | | |
|---|---|---|---|---|
| 7,099,305 B1 * | 8/2006 | Fardid | ............................ | 370/352 |
| 7,606,145 B2 * | 10/2009 | Wang et al. | ................... | 370/228 |
| 2003/0224782 A1 * | 12/2003 | Dougherty | ................. | 455/426.2 |
| 2005/0289347 A1 * | 12/2005 | Ovadia | ........................... | 713/171 |
| 2006/0228113 A1 * | 10/2006 | Cutillo et al. | .................. | 398/71 |
| 2006/0251077 A1 * | 11/2006 | Chou | ............................ | 370/392 |
| 2007/0019956 A1 * | 1/2007 | Sorin et al. | ...................... | 398/71 |
| 2007/0165578 A1 * | 7/2007 | Yee et al. | ....................... | 370/337 |
| 2008/0037988 A1 * | 2/2008 | Bullock | .......................... | 398/59 |
| 2010/0172283 A1 * | 7/2010 | Karaoguz et al. | ............. | 370/312 |

FOREIGN PATENT DOCUMENTS

CN 100486205 C 5/2009

(Continued)

OTHER PUBLICATIONS

Yuanqiu et al. "Integrating Optical and Wireless Services in the Access Network", Optical Fiber communication Conference, 2006.*

(Continued)

*Primary Examiner* — Ricky Ngo
*Assistant Examiner* — Rasheed Gidado
(74) *Attorney, Agent, or Firm* — Leydig, Voit & Mayer, Ltd.

(57) ABSTRACT

A method and system for interconnecting a broadband wireless network with a wired network includes interconnecting a broadband wireless access (BWA) network with an optical access (OAN) broadband network at any reference point among reference points T, a, ODN, and V in the OAN broadband network, and interconnecting them with a digital subscriber line (DSL) network by the reference point V in the DSL network. The method of the present invention can solve the problem of the interconnection between the worldwide interoperability for microwave access (WiMAX) network and the OAN broadband network, and the DSL network. An evolution approach is provided for the OAN broadband network operator and the DSL network operator to develop the WiMAX network.

3 Claims, 29 Drawing Sheets

FOREIGN PATENT DOCUMENTS

WO    WO 2005/055580 A1    6/2005

OTHER PUBLICATIONS

Peng et al. "Optimal utility-based bandwidth allocation over integrated optical and WiMAX networks", Optical Fiber communication Conference, 2006.*

Yuanqiu et al. "A QOS Architecture of Integrating GEPON and WiMAX in the Access Network", Sarnoff Symposium, 2006 IEEE.*

Pantjiaros et al., "Freehands Fibre and Radio Enhanced Integration in Heterogeneous Access Networks for Delivery of Broadband Services," EURESCOM Technical Information, 1-144 (May 2003) http://www.eurescom.de/public/projectresults/P1000-series/P1015-TI9.asp.

First Office Action in corresponding Chinese Application No. 200510127443.8, mailed Jul. 4, 2008.

Written Opinion in corresponding PCT Application No. PCT/CN2006/003263, mailed Mar. 15, 2007.

First Office Action in corresponding European Application No. 06828228.4-1249, mailed Feb. 16, 2010.

"Draft IEEE Standard for Local and metropolitan area networks—Part 16: Air Interface for Fixed and Mobile Broadband Wireless Access Systems—Amendment for Physical and Medium Access Control Layers for Combined Fixed and Mobile Operation in Licensed Bands," *IEEE*, IEEE P802.16e/D11, Sep. 13, 2005.

"IEEE Standard for Local and metropolitan area networks—Part 16: Air Interface for Fixed Broadband Wireless Access Systems," *IEEE*, IEEE Std. 802.16-2004 (Revision of IEEE Std. 802.16-2001), Oct. 1, 2004.

* cited by examiner

METHOD AND SYSTEM FOR INTERCONNECTING BROADBAND WIRELESS ACCESS NETWORK WITH OPTICAL ACCESS BROADBAND NETWORK

This application is a continuation of International Patent Application No. PCT/CN2006/003263, filed on Dec. 4, 2006, which claims priority to Chinese Patent Applications No. 200510127443.8, No. 200510130080.3, and No. 200510130532.8, submitted with the State Intellectual Property Office of P.R.C. on Dec. 2, 2005, Dec. 8, 2005 and Dec. 14, 2005 respectively, and entitled "A Method and System for Interconnecting the Broadband Wireless Access Network with the Optical Access Broadband Network", all of which are hereby incorporated by reference in their entireties.

FIELD OF THE INVENTION

The present invention relates to the communication field, and more particularly, to a method and a system for interconnecting a broadband wireless access (BWA) network with an optical access broadband network.

BACKGROUND

Along with the development of an optical communication technology, a fiber to the home (FTTH) technology has become a hot issue in the communication field. Currently, with the development of a passive optical network (PON) technology, the FTTH technology has entered a rapid development period.

The network architecture of a fiber to x (FTTx) network, i.e. an optical access network (OAN) is shown in FIG. 1 and FIG. 2. The components of the network architecture are described below with reference to the accompanying drawings.

As shown in the FIGS. 1 and 2, the OAN includes a customer premises network (CPN), an access network (AN) and a service node function (SNF). The main network elements of the OAN include an optical line terminal (OLT), an optical distribution network (ODN), an optical network unit/terminal (ONU/ONT), and an adaptation function (AF). In the AN, the AF is an optional equipment, which is mainly adapted to accomplish the conversion between an ONU/ONT interface and a user network interface (UNI). The AF may alternatively be set in the ONU/ONT, and as a result, a reference point a does not exist. The AF may also be set behind the OLT to accomplish the conversion between an OLT interface and a service node interface (SNI). The AF may be considered as a function entity of the CPN or a function entity of the AN. T is a reference point of the UNI interface, and V is a reference point of the SNI interface. The OLT provides a network interface for the ODN and is connected to at least one ODN. The ODN provides a transmission mean for the OLT and the ONU/ONT. The ONU/ONT provides a user side interface for the OAN and is connected to the ODN.

A customer premises equipment (CPE) is connected to the AF through the UNI interface (e.g., through a DSL line). The AF converts a message from an UNI interface format into an interface (e.g., an Ethernet link) format capable of being connected to the ONU/ONT. The ONU/ONT further converts the message into a format capable of being transmitted on the ODN (such as a package of the Ethernet over passive optical network (EPON) and a package of a generic framing of the gigabit over passive optical network (GPON)). The OLT converts the message into an SNI interface (e.g., the Ethernet link) format, and accesses the SNF.

The status of the optical network has been described above, and the status of the wireless communication network is described below.

Currently, BWA equipments in the wireless communication network provide convenient broadband access services for subscribers, which specifically include BWA equipments based on private protocols and BWA equipments based on standard protocols. The BWA equipments defined by an Institute of Electrical and Electronics Engineers (IEEE) 802.16 Standard is a subset of BWA equipments based on a series of BWA technology standards. That is, the BWA equipments include worldwide interoperability for microwave access (WiMAX) equipments.

IEEE 802.16 is a BWA standard, which includes two versions: "802.16-2004", i.e. a broadband fixed wireless access version of the 802.16 standard; and "802.16e", i.e. a broadband mobile wireless access version of the 802.16 standard. There are only two network elements defined in the version 802.16-2004: a base station (BS) and a subscriber station (SS), which are interconnected with each other through the broadband fixed wireless access technology. There are also two network elements defined in the version 802.16e: the BS and a mobile station (MS), which are interconnected with each other through the broadband mobile wireless access technology.

In order to support wireless communication functions such as fixed, nomadic, portable, simple IP mobile, or full mobile access, a WiMAX network is proposed in this field based on the 802.16 standard, in which an access service network (ASN) and a connection service network (CSN) are defined.

Take 802.16e standard as an example, a schematic view of a reference architecture of the WiMAX network is shown in FIG. 3. In FIG. 3, R1 is a reference point between an MS and the ASN; R3 is a reference point between the ASN and the CSN; and T is the reference point between a terminal equipment (TE) and the MS in the CPN network. The MS may simply be a mobile terminal, alternatively, the MS may be attached with the TE.

Along with the rapid development of the OAN technology, it has become possible to provide high bandwidth access services for the subscribers. The wireless access, such as WiMAX, has provided conditions for achieving a mobility of the broadband access and an expansion of broadband coverage.

However, in the prior art, the OAN and the wireless access network are independent from each other and are not intercommunicated. That is, no solution has been proposed about distributing WiMAX wireless base stations by using the existing OAN network resources, and about realizing interconnection between the WiMAX network and the OAN network. Thus, the advantages of the two networks have not been further utilized effectively.

There is another wired communication network, i.e. a digital subscriber line (DSL) network, widely used in the communication system. The architecture of the DSL network is evolving from a point-to-point protocol (PPP) over asynchronous transfer mode (ATM) to an IP quality of service (QoS) enabled architecture based on an Ethernet aggregation and connectivity.

A universal structure of the enabled architecture is shown in FIG. 4. In the DSL network shown in FIG. 4, T is a reference point between the TE and a DSL Modem in the CPN network; U is a reference point between the DSL Modem and an access point digital subscriber line access multiplexer (DSLAM); V is an Ethernet aggregation reference point between the DSLAM and a broadband remote access server (BRAS) in the AN; A10 is a reference point between the AN and a service provider (SP), which may connect an application service provider (ASP) to a network service provider (NSP) possessing the AN, or connect the NSP to a visitor AN under roaming. The CPN network and the AN are interconnected through the DSL access technology.

Currently, the DSL network has been widely laid by operators in the field, but the DSL network has not yet been interconnected with the existing OAN and BWA network. That is, the BWA network, the DSL network and the OAN are not interconnected with one another in the prior art to make full use of the advantages of various networks to provide better communication services.

SUMMARY

The invention provides a method and a system for interconnecting a broadband wireless access (BWA) network with an optical access (OAN) broadband network to solve the problem of interconnecting the WiMAX network with the OAN broadband network, to make full use of the advantages of the two networks to provide better services.

The present invention provides a method for interconnecting a BWA network with a wired network, applicable for realizing the interconnection between the BWA network and an OAN broadband network, and the method includes: interconnecting the BWA network with the OAN broadband network at a selected reference point in the OAN broadband network, in which the reference point is any one selected from a group consisting of a reference point T, a reference point a, a reference point optical distribution network (ODN), and a reference point V.

The present invention further provides a system for interconnecting a BWA network with the wired network, the system includes the BWA network and an OAN broadband network, and further includes: a base station equipment set in the BWA network, the base station equipment is adapted to realize access services of wireless subscribers, realize interconnection with the OAN broadband network through at least one pair of wired cables at a reference point T, a reference point a, a reference point V or a reference point ODN in the OAN, and perform information interaction between the BWA network and the OAN broadband network.

The present invention further provides a method for interconnecting a BWA network with a wired network, applicable for realizing the interconnection between the BWA network, an OAN broadband network and a digital subscriber line (DSL) network, and the method includes: interconnecting the BWA network, the OAN broadband network and the DSL network at selected reference points in the OAN broadband network and the DSL network, in which the reference points include any one selected from a group consisting of a reference point T, a reference point a, a reference point ODN and a reference point V in the OAN broadband network, and a reference point V in the DSL network.

The present invention further provides a system for interconnecting a BWA network with a wired network, the system includes: the BWA network, an OAN broadband network, and a DSL network interconnecting with each other at selected reference points in the OAN broadband network and the DSL network, in which the reference points include any one selected from a group consisting of a reference point T, a reference point a, a reference point ODN, and a reference point V in the OAN broadband network, and a reference point V in the DSL network.

The present invention further provides a method for interconnecting a BWA network with a wired network, applicable for realizing the interconnection between the BWA network, an OAN broadband network and a DSL network with each other, and the method includes: interconnecting any two of the BWA network, the OAN broadband network and the DSL network at the selected reference point V in the OAN broadband network and the DSL network through an interworking unit (IWU).

The present invention further provides a system for interconnecting a BWA network with a wired network, the system includes the BWA network, an OAN broadband network, a DSL network, and network interworking units respectively interconnected with each of the networks.

The network interworking unit is adapted to interconnect any two of the BWA network, the OAN broadband network, and the DSL network at a selected reference point A10 in the OAN broadband network and the DSL network, and particularly adapted to interconnect networks requiring interconnection through at least one pair of wired cables, perform protocol conversion on services of different protocols transferred from the networks requiring interconnection, and exchange services of different protocols transferred from the networks requiring interconnection between any two wired service processing units.

As seen from the technical solutions of the present invention, the present invention has the following advantages compared with the prior art.

1. The present invention provides a solution for interconnecting the 802.16-2004-based WiMAX network with the OAN broadband network and interconnecting the 802.16e-based WiMAX network with the OAN broadband network, thus realizing the interconnection between the two networks. Moreover, the present invention further provides a solution for interconnecting the 802.16-2004-based WiMAX network, the DSL network, and the OAN broadband network, and interconnecting the 802.16e-based WiMAX network, the DSL network, and the OAN broadband network, thus realizing the interconnection among the WiMAX network, the DSL network, and the OAN broadband network.

2. Various interconnection solutions provided in the present invention utilize the WiMAX wireless network to serve as a wireless extension for the wired access of the OAN and the DSL network, and further support fixed wireless, nomadic, portable, and mobile access applications, thereby providing an evolution approach for the OAN and the DSL broadband network operators to develop the WiMAX network.

BRIEF DESCRIPTION OF THE DRAWINGS

FIG. 16 is a structural view of a system for interconnecting the BWA network with the OAN broadband network at the reference point a;

FIG. 17 is a structural view of another system for interconnecting the BWA network with the OAN broadband network at the reference point a;

FIG. 21 is a first schematic view of the system for interconnecting the WiMAX 802.16e network with the OAN broadband network at the reference point a;

FIG. 22 is a second schematic view of the system for interconnecting the WiMAX 802.16e network with the OAN broadband network at the reference point a;

DETAILED DESCRIPTION

The present invention provides an implementation solution for interconnecting the BWA network with the wired network, which particularly includes a method and a system for interconnecting the BWA network with the OAN broadband network. The present invention also provides implementation solutions for interconnecting the BWA network, the OAN broadband network and the DSL network. The implementation solutions for interconnecting the BWA network, the OAN broadband network and the DSL network include two different types of interconnection implementation solutions. The solutions provided in the present invention are respectively described below.

I. The present invention provides a method and a system for interconnecting the BWA network with the OAN broadband network to realize the interconnection of the WiMAX network with the AN of the OAN broadband network at the reference point T, the reference point a, the reference point ODN or the reference point V.

The method for interconnecting the WiMAX network with the OAN broadband network is described first, which includes four solutions of interconnecting the WiMAX 802.16-2004 network with the OAN broadband network and interconnecting the WiMAX 802.16e network with the OAN broadband network at the reference point T, the reference point a, the reference point ODN or the reference point V. The four solutions are respectively described herein below.

Solution 1: The solution includes interconnections between the WiMAX 802.16-2004 network and the OAN broadband network, and between the WiMAX 802.16e network and the OAN broadband network, at the reference point T.

Figure 5:
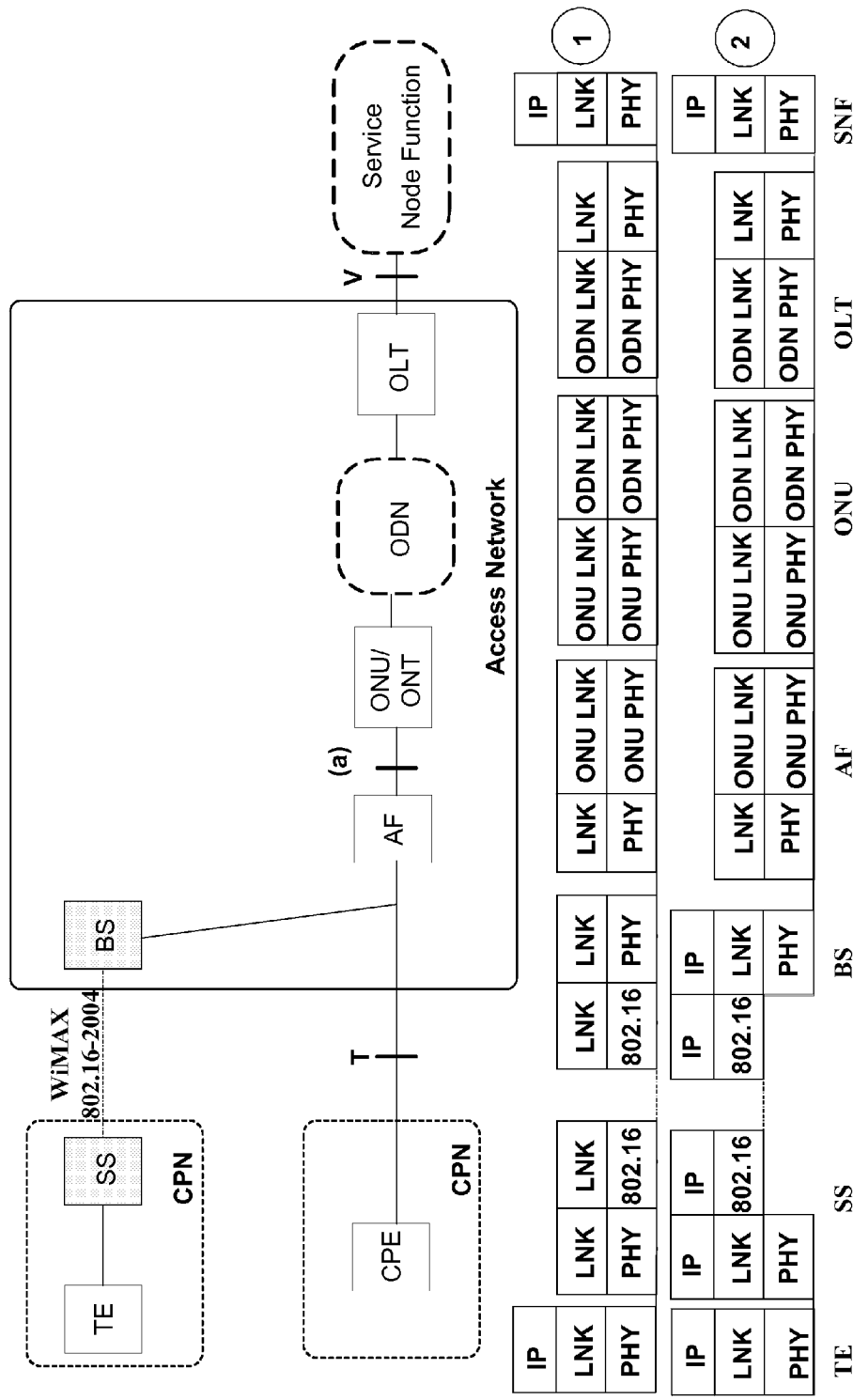
FIG. 5 is a schematic view of interconnecting the WiMAX 802.16-2004 network with the OAN broadband network at the reference point T according to the present invention.

1. FIG. 5 is a schematic view of an implementation solution for interconnecting the WiMAX 802.16-2004 network with the OAN broadband network at the reference point T, which is described below in detail.

It belongs to a tight-coupling solution to interconnect the WiMAX 802.16-2004 network with the OAN broadband network at the reference point T. The WiMAX 802.16-2004 network directly utilizes the existing wired resources of the OAN, for example, a fiber to the building/a fiber to the curb (FTTB/FTTC) network possessed by the operators (see FIG.

1), and a WiMAX base station (BS) is established in the building, and accesses the OAN network through the ONU by directly using copper wire resources in the building, thereby reducing the additional wiring for the BS to access the broadband network. According to various WiMAX access modes, the interconnection solution includes two modes. FIG. 5 shows protocol stacks of the two modes in a path of TE-SS-BS-AF-ONU-OLT-SNF. This path is an end-to-end path for the WiMAX 802.16-2004 network to access the OAN network at the reference point T of the OAN. This solution is mainly applicable for fixed access applications, but WiMAX subscribers should have certain nomadic capabilities. The two modes in this solution are respectively described below.

Mode 1: In the path of TE-SS-BS-AF-ONU-OLT-SNF, a Layer 2 bridging is employed on the CPE and the SNF, an 802.16-2004 Layer 2 wireless access technology is employed between the SS and the BS, and the 802.16-2004 Layer 2 wireless access technology supports an Ethernet convergence sub-layer (ETH CS) at an airlink to serve as an extension of the copper wire access in the FTTB.

Mode 2: In the path of TE-SS-BS-AF-ONU-OLT-SNF, the TE, the SS, the BS, and the SFN are all Layer 3 network elements, an 802.16-2004 Layer 3 wireless access technology is employed between the SS and the BS, and the 802.16-2004 Layer 3 wireless access technology supports an IP convergence sub-layer (IP CS) at the airlink to serve as the extension of the copper wire access in the FTTB/FTTC.

In terms of security of the above two modes, an 802.16 sub-layer private key management (PKM) security architecture is employed between the SS and the BS.

Figure 6:
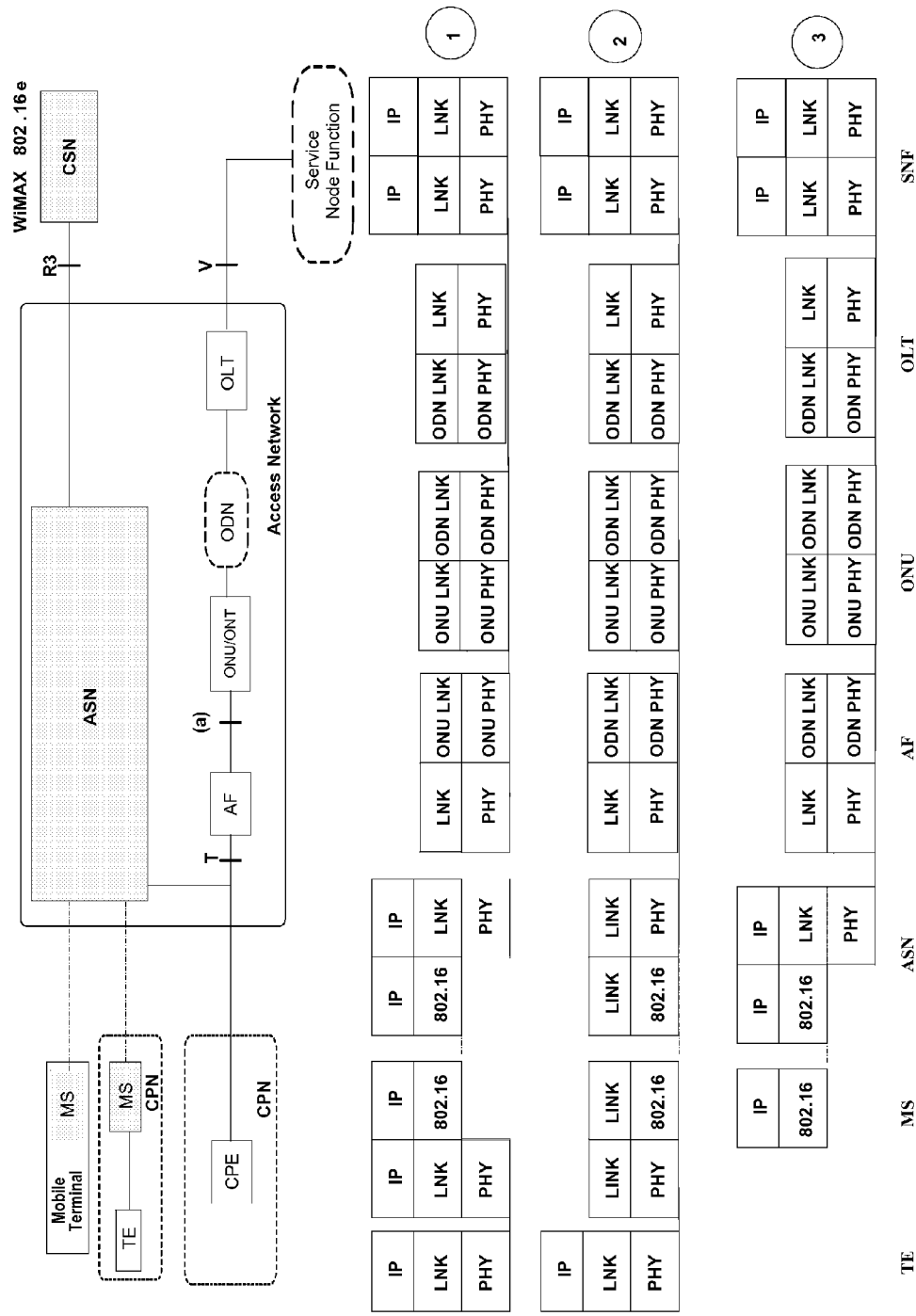
FIG. 6 is a schematic view of interconnecting the WiMAX 802.16e network with the OAN broadband network at the reference point T according to the present invention.

2. FIG. 6 is a schematic view of an implementation solution for interconnecting the WiMAX 802.16e network with the OAN broadband network through the ASN at the reference point T, which is described below in detail.

The WiMAX 802.16e network is connected to the AF through the ASN, accesses the ODN through the ONU, and accesses the SNF. The solution belongs to a tight-coupling solution. The WiMAX 802.16e network accesses the ODN through the ONU, and accesses the SNF through the ODN. This solution includes three access modes, and the protocol stacks of the three modes in a path of TE-MS-ASN-AF-ONU-OLT-SFN are respectively shown in FIG. 6. This path is an end-to-end path for the WiMAX 802.16e network to access the OAN network at the reference point T of the OAN. This solution mainly supports the fixed access and nomadic properties of the WiMAX, and also supports portable and mobile access to a certain extent. Due to accessing the same SNF, uniform authentication, accounting, and customer care can be supported. The three modes in this solution are described herein below.

Mode 1: In the path of TE-MS-ASN-AF-ONU-OLT-SFN, the MS is attached with the TE, an IP Layer 3 routing technology is employed between an egress node of the ASN and the MS, and the IP Layer 3 routing technology supports the IP CS at the airlink.

Mode 2: In the path of TE-MS-ASN-AF-ONU-OLT-SFN, the MS is attached with the TE, a Layer 2 network bridging technology, e.g. Ethernet bridging, is employed between the egress node of the ASN and the MS, and the Layer 2 network bridging technology supports the ETH CS at the airlink.

Mode 3: In the path of TE-MS-ASN-AF-ONU-OLT-SFN, the MS may simply be the mobile terminal, the IP Layer 3 routing technology is employed between an ingress node of the ASN and the MS, and the IP Layer 3 routing technology supports the IP CS at the airlink.

Solution 2: The solution includes interconnections between the WiMAX 802.16-2004 and the OAN broadband network, and between the WiMAX 802.16e and the OAN broadband network, at the reference point a.

Figure 7:
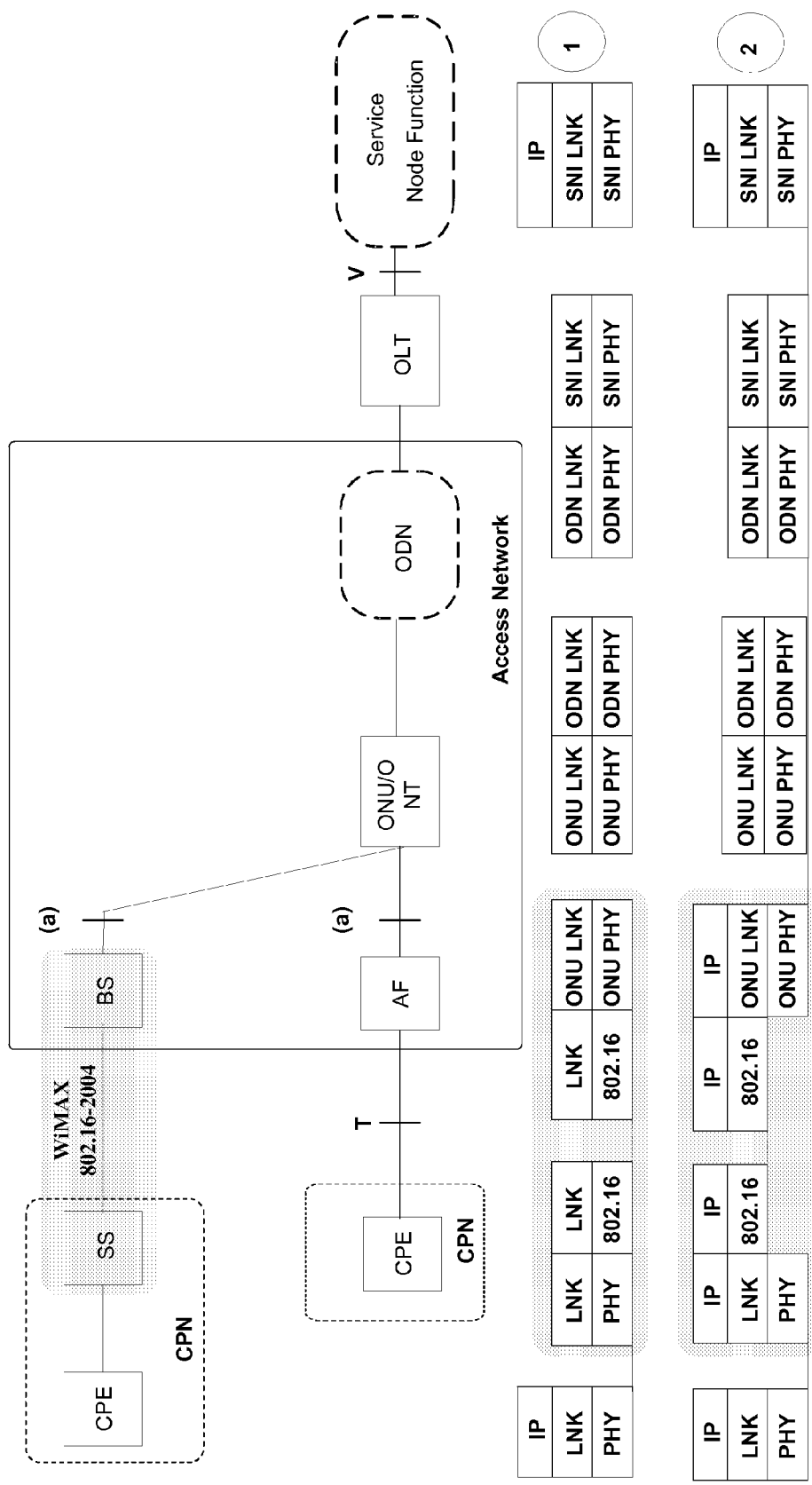
FIG. 7 is a schematic view of interconnecting the WiMAX 802.16-2004 network with the OAN broadband network at the reference point a according to the present invention.

1. FIG. 7 is a schematic view of an implementation solution for interconnecting the WiMAX 802.16-2004 network with the OAN broadband network at the reference point a, which is described below in detail.

Figure 1:
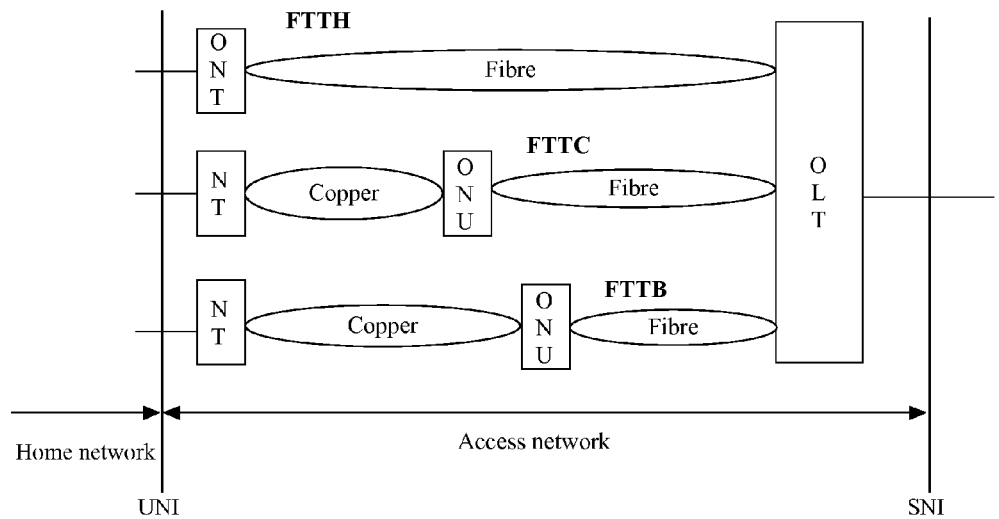
FIG. 1 is a first schematic architectural view of an FTTx network.
Figure 2:
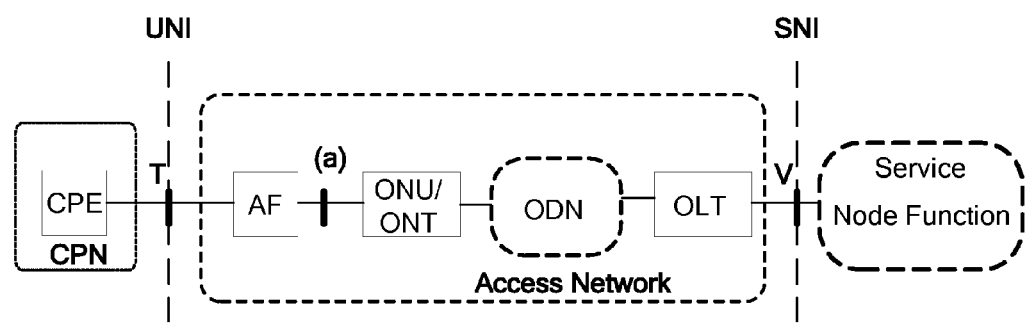
FIG. 2 is a second schematic architectural view of the FTTx network.
Figure 3:
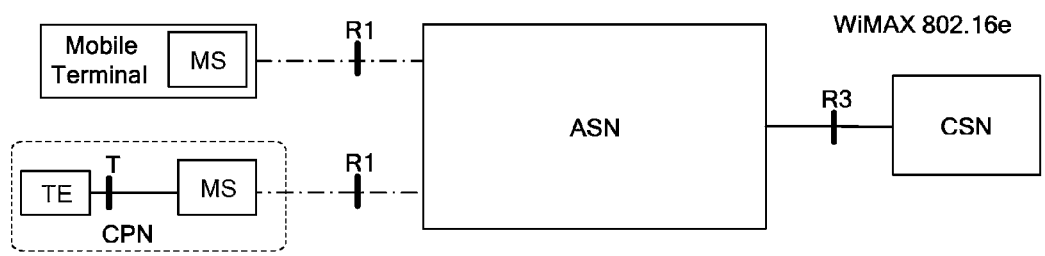
FIG. 3 is a schematic view of a reference architecture of a WiMAX network by taking a WiMAX 802.16e network as an example.
Figure 4:
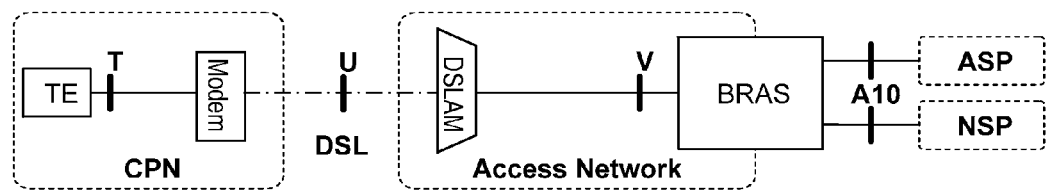
FIG. 4 is a schematic view of a general structure of the DSL enabled architecture.

It belongs to a tight-coupling solution to interconnect the WiMAX 802.16-2004 network with the OAN broadband network at the reference point a. The WiMAX 802.16-2004 network directly utilizes the existing wired resources of the OAN, for example, the FTTB/FTTC network possessed by the operator (see FIG. 1). In this solution, the BS is integrated with an AF function, the WiMAX base station (BS) is established in the building, directly accesses the ONU, and accesses the ODN network through the ONU. According to various WiMAX access modes, the interconnection solution includes two modes. The protocol stacks of the two modes in a path of TE-SS-BS-ONU-OLT-SNF are respectively shown in FIG. 7. This path is an end-to-end path for the WiMAX 802.16-2004 network to access the OAN network at the reference point a of the OAN. This solution is mainly applicable for the fixed access applications, but WiMAX subscribers should have certain nomadic capabilities. The two modes in this solution are described below.

Mode 1: In the path of TE-SS-BS-ONU-OLT-SNF, the Layer 2 bridging is employed on the CPE and the SNF, the 802.16-2004 Layer 2 wireless access technology is employed between the SS and the BS, and the 802.16-2004 Layer 2 wireless access technology supports the ETH CS at the airlink to serve as the extension of the wireless access of the OAN network.

Mode 2: In the path of TE-SS-BS-AF-ONU-OLT-SNF, the TE, the SS, the BS, and the SFN are all Layer 3 network elements, the 802.16-2004 Layer 3 wireless access technology is employed between the SS and the BS, and the 802.16-2004 Layer 3 wireless access technology supports the IP CS at the airlink to serve as the extension of the wireless access of the OAN network.

In terms of security of the above two modes, an 802.16 sub-layer PKM security architecture is continuously employed between the SS and the BS.

Figure 8:
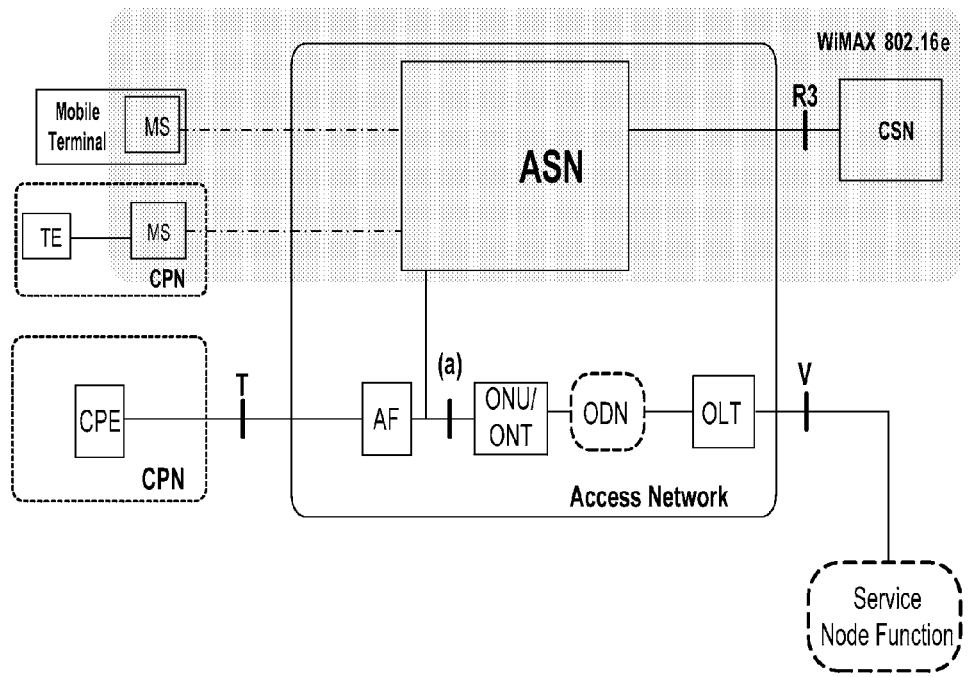
FIG. 8 is a schematic view of interconnecting the WiMAX 802.16e network with the OAN broadband network at the reference point a according to the present invention.

2. FIG. 8 is a schematic view of an implementation solution for interconnecting the WiMAX 802.16e network with the OAN broadband network through the ASN at the reference point a, which is described below in detail.

The WiMAX 802.16e network is connected to the AF through the ASN, accesses the ODN through the ONU, and accesses the SNF. The solution belongs to a tight-coupling solution. The AF is set in the ASN. The WiMAX 802.16e network accesses the ODN through the ONU, and accesses the SNF through the ODN. This solution includes three access modes, and the protocol stacks of the three modes in a path of TE-MS-ASN-ONU-OLT-SFN are respectively shown in FIG. 8. This path is an end-to-end path for the WiMAX 802.16e network to access the OAN network at the reference point a of the OAN. This solution mainly supports the fixed access and nomadic properties of the WiMAX, and also supports portable and mobile access to a certain extent. Due to accessing the same SNF, uniform authentication, accounting, and customer care are supported. The three modes in this solution are described herein below.

Mode 1: In the path of TE-MS-ASN-ONU-OLT-SFN, the MS is attached with the TE, the IP Layer 3 routing technology is employed between the egress node of the ASN and the MS, and the IP Layer 3 routing technology supports the IP CS at the airlink.

Mode 2: In the path of TE-MS-ASN-ONU-OLT-SFN, the MS is attached with the TE, the Layer 2 network bridging technology, e.g. Ethernet bridging, is employed between the egress node of the ASN and the MS, and the Layer 2 network bridging technology supports the ETH CS at the airlink.

Mode 3: In the path of TE-MS-ASN-ONU-OLT-SFN, the MS may simply be a mobile terminal, the IP Layer 3 routing technology is employed between the ingress node of the ASN and the MS, and the IP Layer 3 routing technology supports the IP CS at the airlink.

As shown in FIG. 8, the CPE of the OAN terminal accesses the ASN through the AF to share the CSN. Both the WiMAX 802.16e network and the OAN network access the CSN to utilize the uniform authentication, accounting, and service application functions of the CSN, and thus this access manner supports uniform authentication, accounting, and customer care. This access manner includes two access modes, and the protocol stacks of the various modes in a path of CPE-AF-ASN-CSN are respectively shown in FIG. 8. The two access modes of this access manner are described below in detail.

Mode 4: The CPE of the OAN directly accesses the ASN network through the AF to share the CSN of the WiMAX 802.16e network, and the ASN is a Layer 3 access.

Mode 5: the CPE of the OAN directly accesses the ASN network through the AF to share the CSN of the WiMAX 802.16e network, and the ASN is a Layer 2 access.

Solution 3: The solution includes the interconnection between the WiMAX 802.16-2004 network and the OAN broadband network, and between the WiMAX 802.16e and the OAN broadband network, at the reference point ODN, i.e. to realize the interconnections through the ODN.

Figure 9:
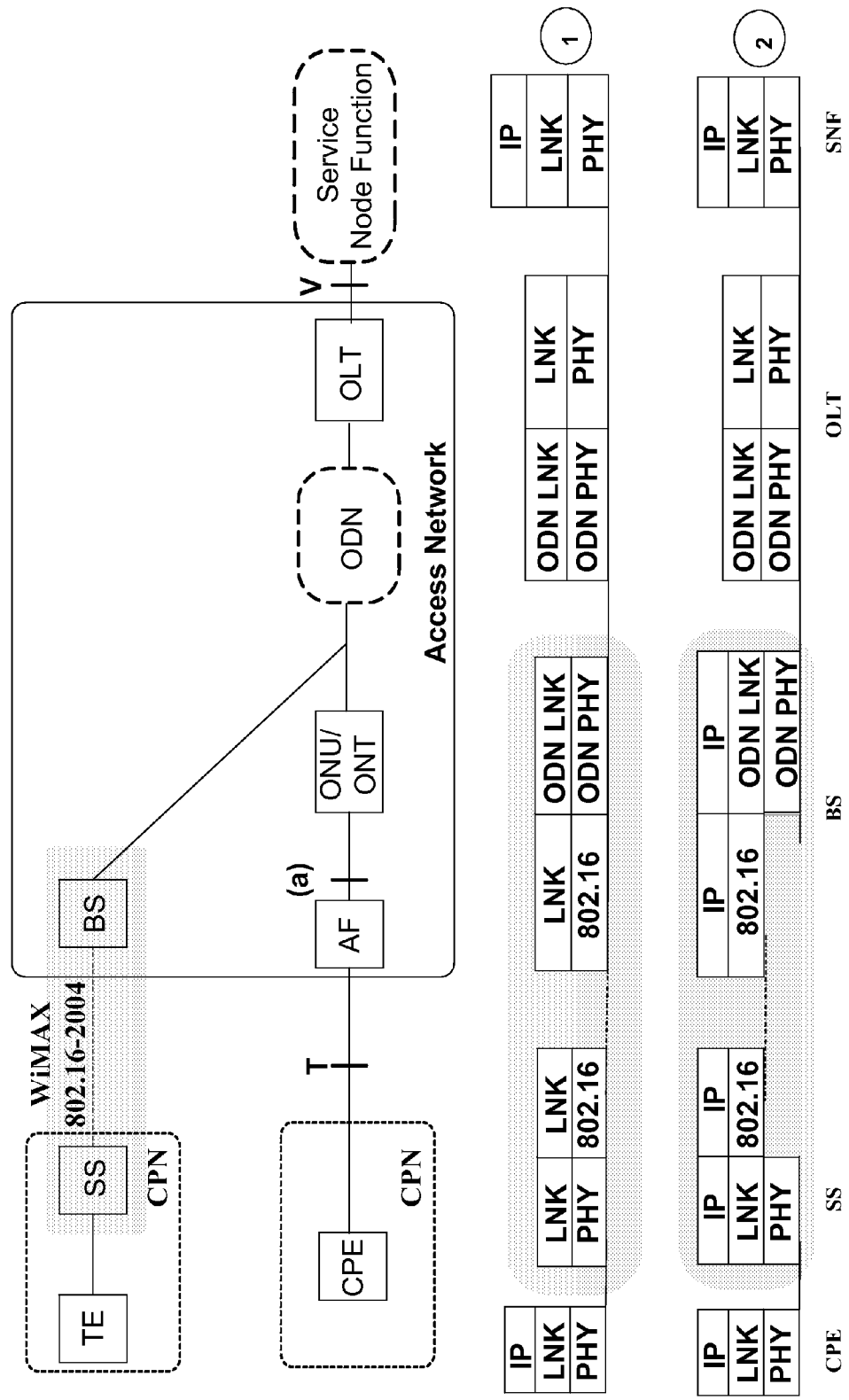
FIG. 9 is a schematic view of interconnecting the WiMAX 802.16-2004 network with the OAN broadband network at the reference point ODN according to the present invention.

1. FIG. 9 is a schematic view of an implementation solution for interconnecting the WiMAX 802.16-2004 network with the OAN broadband network at the reference point ODN, which is described below in detail.

It belongs to a tight-coupling solution to interconnect the WiMAX 802.16-2004 network with the OAN broadband network at the reference point ODN. The WiMAX 802.16-2004 network directly utilizes the existing wired resources of the OAN, for example, the FTTH network possessed by the operator (see FIG. 1). In this solution, the BS is integrated with the AF and ONU functions, the WiMAX base station (BS) is established in the building, and directly accesses the ODN network. According to various WiMAX access modes, the interconnection solution includes two modes, and the protocol stacks of the two modes in a path of TE-SS-BS-ONU-OLT-SNF are respectively shown in FIG. 9. This path is an end-to-end path for the WiMAX 802.16-2004 network to access the OAN network at the reference point ODN of the OAN. This solution is mainly applicable for fixed access applications, but the WiMAX subscribers should have certain nomadic capabilities. The two modes in this solution are described below.

Mode 1: In the path of TE-SS-BS-OLT-SNF, the Layer 2 bridging is employed on the CPE and the SNF, the 802.16-2004 Layer 2 wireless access technology is employed between the SS and the BS, and the 802.16-2004 Layer 2 wireless access technology supports the ETH CS at the airlink to serve as the extension of the wireless access of the OAN network.

Mode 2: In the path of TE-SS-BS-OLT-SNF, the TE, the SS, the BS, and the SFN are all Layer 3 network elements, the 802.16-2004 Layer 3 wireless access technology is employed between the SS and the BS, and the 802.16-2004 Layer 3 wireless access technology supports the IP CS at the airlink to serve as the extension of the wireless access of the OAN network.

In terms of security of the above two modes, the 802.16 sub-layer PKM security architecture is employed between the SS and the BS, and a passive optical network (PON) security system is employed between the BS and the OLT.

Figure 10:
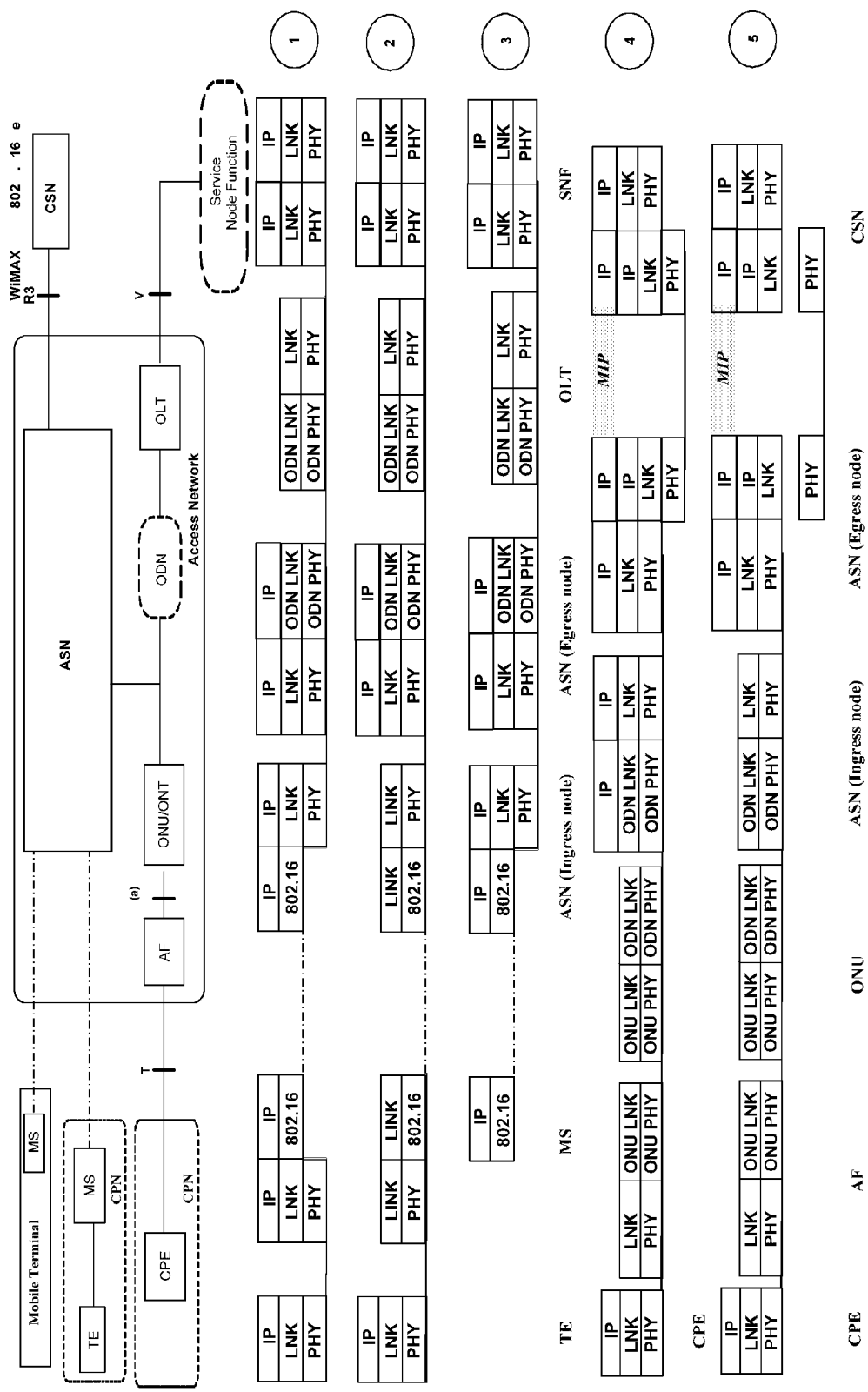
FIG. 10 is a schematic view of interconnecting the WiMAX 802.16e network with the OAN broadband network at the reference point ODN according to the present invention.

2. FIG. 10 is a schematic view of an implementation solution for interconnecting the WiMAX 802.16e network with the OAN broadband network through the ASN at the reference point ODN, which is described below in detail.

The WiMAX 802.16e network directly accesses the ODN through the ASN, and then accesses the SNF through the OLT, which belongs to a tight-coupling solution. The WiMAX 802.16e network is taken as a node of the OLT when accessing the OAN, and accesses the SNF through the ODN. This solution includes three access modes, and the protocol stacks of the three modes in a path of TE-MS-ASN-OLT-SFN are respectively shown in FIG. 10. This path is an end-to-end path for the WiMAX 802.16e network to access the OAN network at the reference point ODN of the OAN. This solution mainly supports the fixed access and nomadic properties of the WiMAX, and also supports portable and mobile access to a certain extent. Due to accessing the same SNF, the uniform authentication, accounting, and customer care are supported. The three modes in this solution are described herein below.

Mode 1: in the path of TE-MS-ASN-OLT-SFN, the MS is attached with the TE, the IP Layer 3 routing technology is employed between the egress node of the ASN and the MS, and the IP Layer 3 routing technology supports the IP CS at the airlink.

Mode 2: in the path of TE-MS-ASN-OLT-SFN, the MS is attached with the TE, the Layer 2 network bridging technology, e.g. Ethernet bridging, is employed between the egress node of the ASN and the MS, and the Layer 2 network bridging technology supports the ETH CS at the airlink.

Mode 3: in the path of TE-MS-ASN-OLT-SFN, the MS may simply be a mobile terminal, the IP Layer 3 routing technology is employed between the ingress node of the ASN and the MS, and the IP Layer 3 routing technology supports the IP CS at the airlink.

As shown in FIG. 10, this solution may also serve as an access manner to perform optical access expansion by the operator who already possesses the WiMAX 802.16e network, which also belongs to a tight-coupling solution. In this access manner, the OAN network access ASN through the ONU and optical fibers and shares the CSN. As both the WiMAX 802.16e network and the OAN network access the CSN to utilize the uniform authentication, accounting, and service application functions of the CSN, this access manner supports uniform authentication, accounting, and customer care. This access manner includes two access modes, and the protocol stacks of the access modes in a path of CPE-AF-ONU-ASN-CSN are respectively shown in FIG. 10. The two access modes of this access manner are described herein below.

Mode 4: the CPE of the OAN network accesses the OLT through the OAN technology (e.g. EPON technology or GPON technology), and accesses the WiMAX 802.16e network through the OLT to share the CSN, and the ingress node of the ASN is a Layer 3 access.

Mode 5: the CPE of the OAN network accesses the OLT through the OAN technology (e.g., EPON technology or GPON technology), and accesses the WiMAX 802.16e network through the OLT to share the CSN, and the ingress node of the ASN is a Layer 2 access.

Solution 4: The solution includes interconnections between the WiMAX 802.16-2004 and the OAN broadband network, and between the WiMAX 802.16e with the OAN broadband network, at the reference point V.

Figure 11:
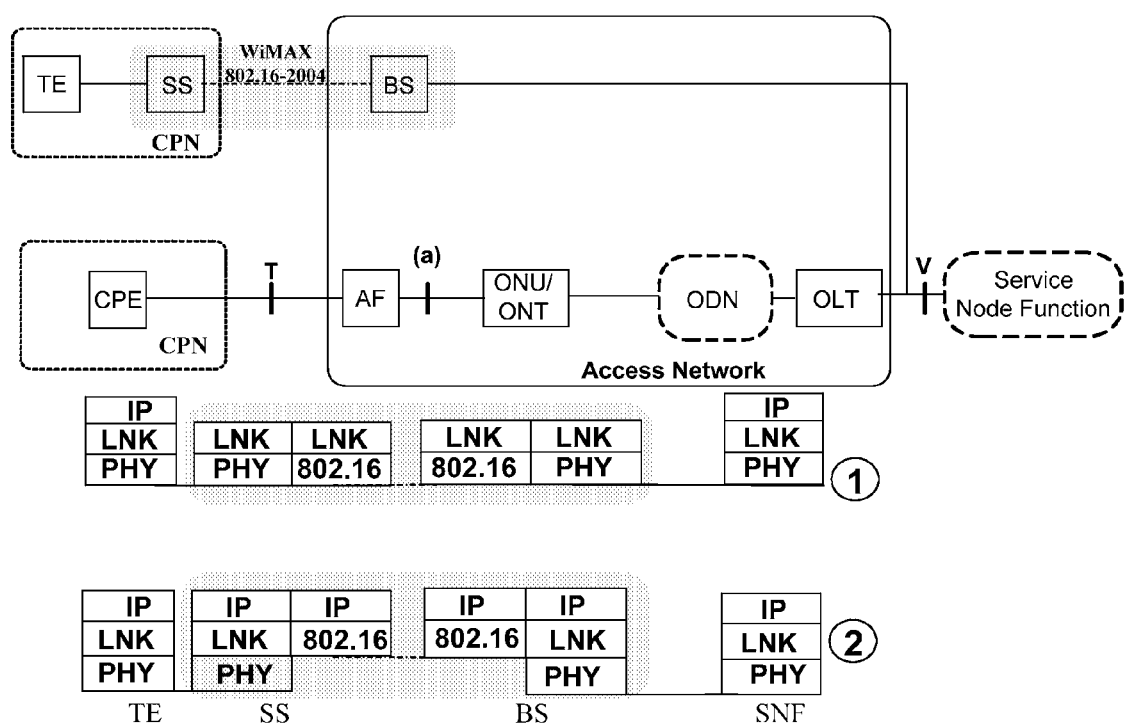
FIG. 11 is a schematic view of interconnecting the WiMAX 802.16-2004 network with the OAN broadband network at the reference point V according to the present invention.

1. FIG. 11 is a schematic view of an implementation solution for interconnecting the WiMAX 802.16-2004 network with the OAN broadband network at the reference point V, which is described below in detail.

It belongs to a loose-coupling solution to interconnect the WiMAX 802.16-2004 network with the OAN broadband network at the reference point V. In this solution, the services and application resources of the WiMAX 802.16-2004 network and the OAN broadband network are shared, so as to perform uniform authentication, accounting, and customer care on a kernel layer. According to various WiMAX access modes, the interconnection solution includes two modes, and the protocol stacks of the two modes in a path of TE-SS-BS-SNF are respectively shown in FIG. 11. This path is an end-to-end path for the WiMAX 802.16-2004 network to access the OAN network at the reference point V of the OAN. The two modes in this solution are described below.

Mode 1: in the path of TE-SS-BS-SNF, the Layer 2 bridging is employed on the CPE and the SNF, the 802.16-2004 Layer 2 wireless access technology is employed between the SS and the BS, and the 802.16-2004 Layer 2 wireless access technology supports the ETH CS at the airlink to serve as an extension of the wireless access of the OAN network.

Mode 2: in the path of TE-SS-BS-SNF, the TE, the SS, the BS, and the SFN are all Layer 3 network elements, the 802.16-2004 Layer 3 wireless access technology is employed between the SS and the BS, and the 802.16-2004 Layer 3 wireless access technology supports the IP CS at the airlink to serve as an extension of the wireless access of the OAN network.

In terms of security of the above two modes, the 802.16 sub-layer PKM security architecture is employed between the SS and the BS.

Figure 12:
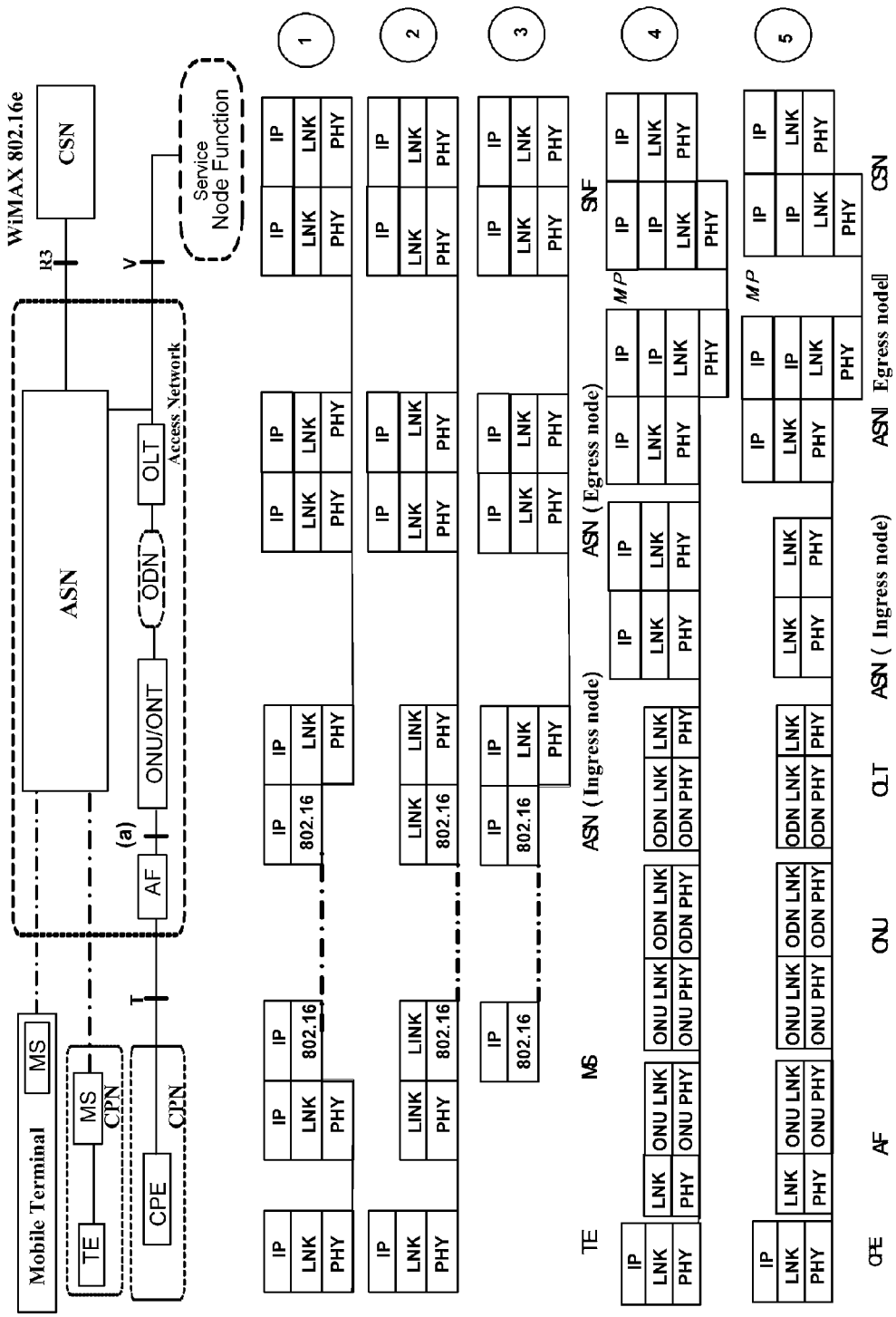
FIG. 12 is a schematic view of interconnecting the WiMAX 802.16e network with the OAN broadband network at the reference point V according to the present invention.
Figure 13:
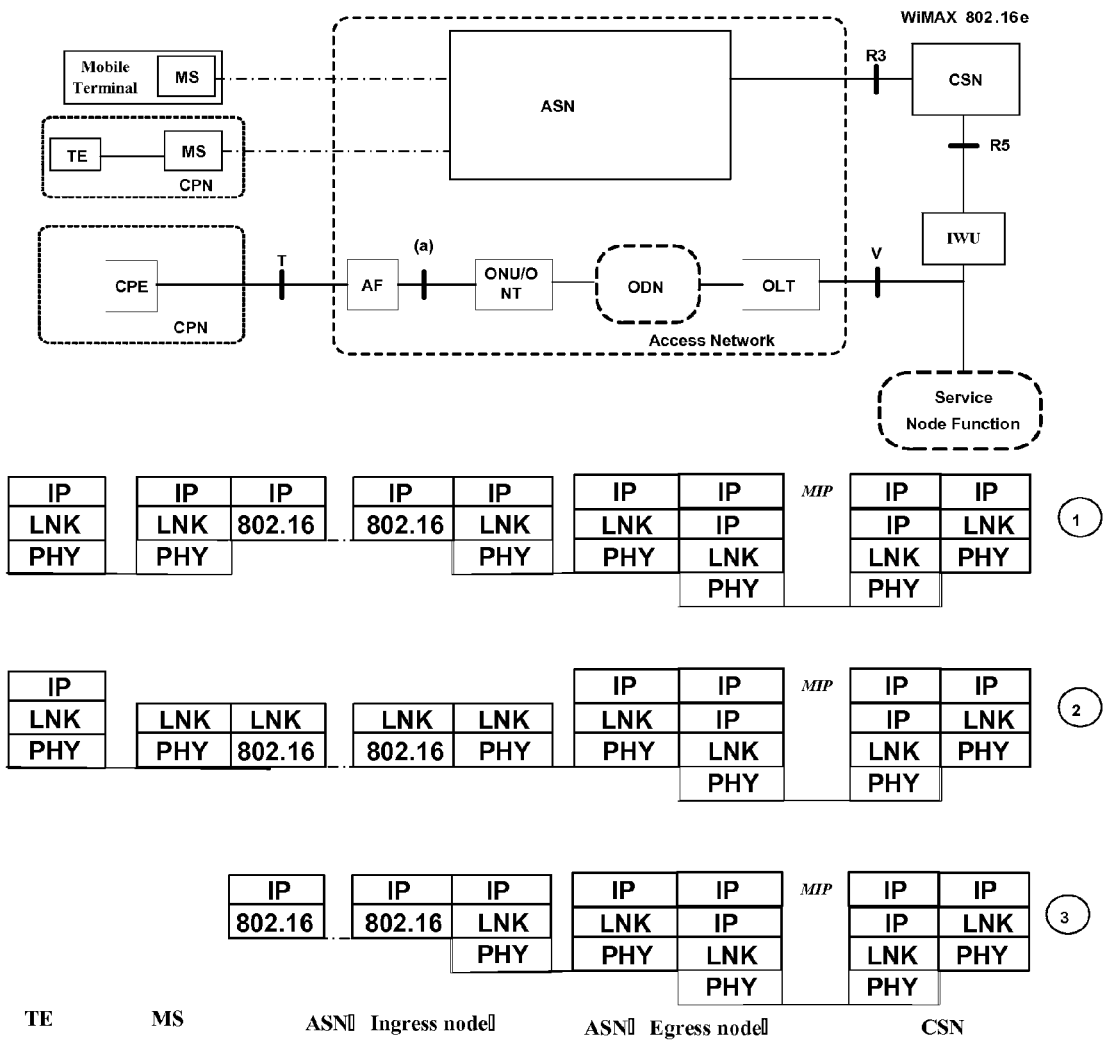
FIG. 13 is a schematic view of interconnecting the WiMAX 802.16e network with the OAN broadband network through an IWU at the reference point V according to the present invention.

2. FIG. 12 and FIG. 13 show schematic views of an implementation solution for interconnecting the WiMAX 802.16e network with the OAN broadband network through the ASN at the reference point V, which is described below in detail.

In the interconnection solution shown in FIG. 12, the WiMAX 802.16e network directly accesses the SNF through the ASN, which belongs to a loose-coupling solution. This solution includes three access modes, and the protocol stacks of the three modes in a path of TE-MS-ASN-SFN are respectively shown in FIG. 12. This path is an end-to-end path for the WiMAX 802.16e network to access the OAN network at the reference point V of the OAN. This solution mainly supports the fixed access and nomadic properties of the WiMAX, and also supports portable and mobile access to a certain extent. Due to accessing the same SNF, uniform authentication, accounting, and customer care are supported. The three modes in this solution are described herein below.

Mode 1: In the path of TE-MS-ASN-SFN, the MS is attached with the TE, the IP Layer 3 routing technology is employed between the egress node of the ASN and the MS, and the IP Layer 3 routing technology supports the IP CS at the airlink.

Mode 2: In the path of TE-MS-ASN-SFN, the MS is attached with the TE, the Layer 2 network bridging technology, e.g. Ethernet bridging, is employed between the egress node of the ASN and the MS, and the Layer 2 network bridging technology supports the ETH CS at the airlink.

Mode 3: In the path of TE-MS-ASN-SFN, the MS may simply be a mobile terminal, the IP Layer 3 routing technology is employed between the ingress node of the ASN and the MS, and the IP Layer 3 routing technology supports the IP CS at the airlink.

As shown in FIG. 12, this solution can serve as an access manner to perform optical access expansion by the operator who already possesses the WiMAX 802.16e network, which also belongs to a loose-coupling solution. In this access manner, the OAN network accesses the ASN through the OLT to share the CSN. As both the WiMAX 802.16e network and the OAN network access the CSN to utilize the uniform authentication, accounting, and service application functions of the CSN, and thus such access manner supports uniform authentication, accounting, and customer care. This access manner includes two access modes. The protocol stacks of the two modes in a path of CPE-AF-ONU-OLT-ASN-CSN are respectively shown in FIG. 12. The two access modes of this access manner are respectively described below.

Mode 4: the CPE of the OAN network accesses the OLT through the OAN technology (e.g., EPON technology or GPON technology), and accesses the WiMAX 802.16e network through the OLT to share the CSN, and the ingress node of the ASN is a Layer 3 access.

Mode 5: the CPE of the OAN network accesses the OLT through the OAN technology (e.g., EPON technology or GPON technology), and accesses the WiMAX 802.16e network through the OLT to share the CSN, and the ingress node of the ASN is a Layer 2 access.

In the interconnection solution shown in FIG. 13, the operator possesses two independent networks, namely the OAN network and the WiMAX 802.16e network. A network element IWU (an interworking unit) is added between the WiMAX 802.16e network and the OAN, which is responsible for the interconnection and intercommunication between the two networks. The CSN interconnects with the IWU through an R5 interface, and interconnects with the OAN broadband network at the reference point V. The OAN network and the WiMAX 802.16e network share the services provided by the SNF, and this solution belongs to a loose-coupling solution.

In this solution, the IWU provides a dynamic host configuration protocol relay (DHCP RELAY) function, provides a DHCP Server for the WiMAX 802.16e network to access the SNF. The IWU also provides an Authentication, Authorization, and Accounting proxy (AAA Proxy) function to access an AAA server of the SNF. The AAA protocol should be based on an EAP over RADIUS (extensible authentication protocol over remote authentication dial-in user service) or EAP over DIAMETER (extensible authentication protocol over DIAMETER authentication). This solution includes three access modes, and the protocol stacks of the three modes in a path of TE-MS-ASN-CSN are respectively shown in FIG. 13. This solution is mainly applicable for portable and mobile access of the WiMAX, and is also applicable for the fixed access and nomadic properties. Due to accessing the same SNF, uniform authentication, accounting, and customer care are supported. The three modes in this solution are described herein below.

Mode 1: In the path of TE-MS-ASN-SFN, the MS may be attached with the TE, the IP Layer 3 routing technology is employed between the egress node of the ASN and the MS, and the IP Layer 3 routing technology supports the IP CS at the airlink.

Mode 2: In the path of TE-MS-ASN-SFN, the MS may be attached with the TE, the Layer 2 network bridging technology, e.g., Ethernet bridging, is employed between the egress node of the ASN and the MS, and the Layer 2 network bridging technology supports the ETH CS at the airlink.

Mode 3: In the path of TE-MS-ASN-SFN, the MS may simply be a mobile terminal, the IP Layer 3 routing technology is employed between the ingress node of the ASN and the MS, and the IP Layer 3 routing technology supports the IP CS at the airlink.

The present invention further provides a system for interconnecting the BWA network with the OAN broadband network. The system may employ, but not limited to, the following five solutions in the actual implementations, and the specific implementations of the five solutions are respectively described below.

Figure 14:
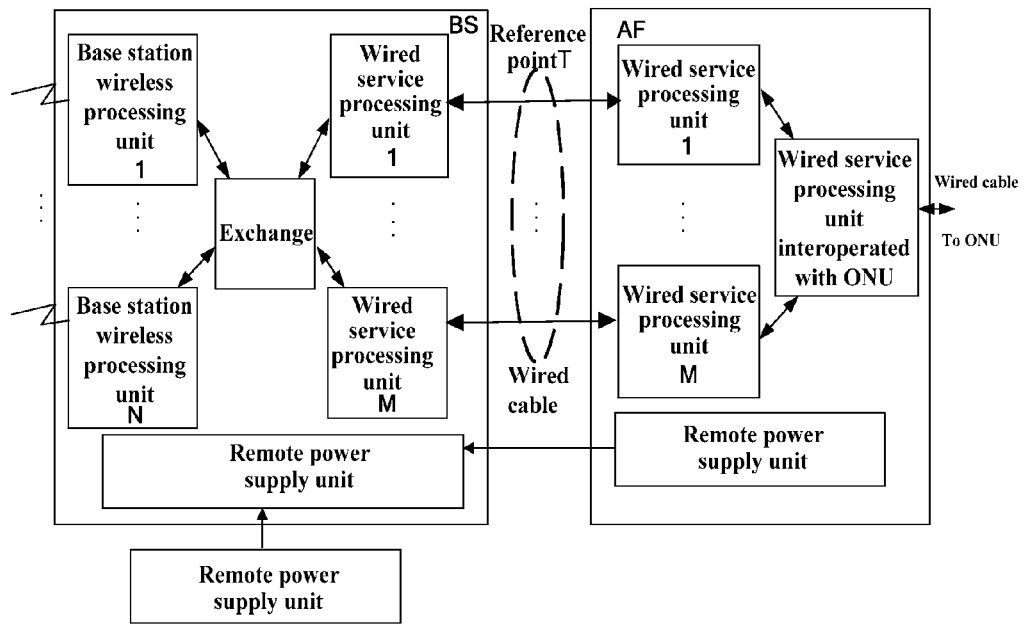
FIG. 14 is a structural view of a system for interconnecting the BWA network with the OAN broadband network at the reference point T.
Figure 15:
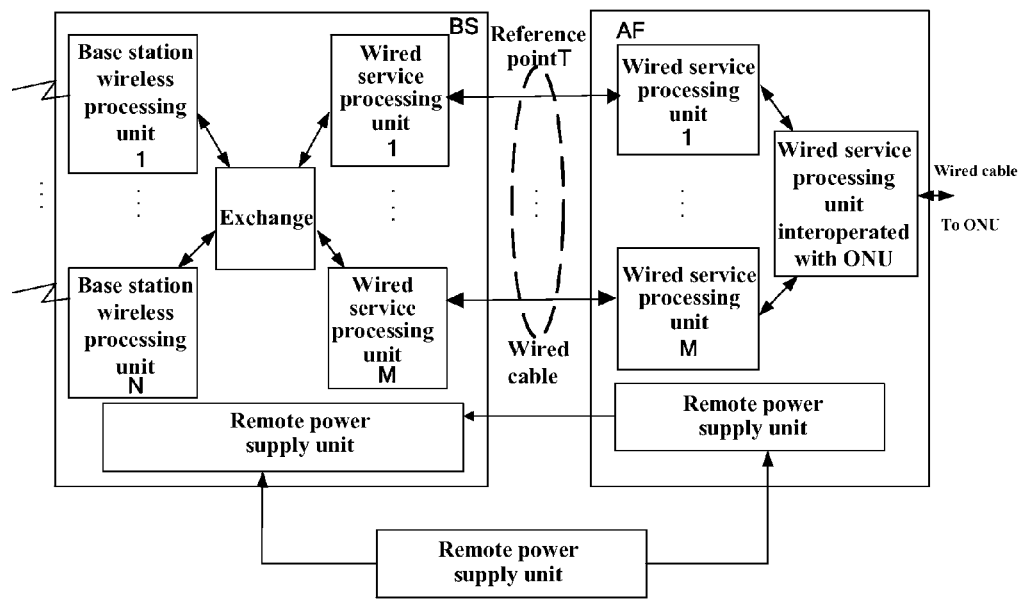
FIG. 15 is a structural view of another system for interconnecting the BWA network with the OAN broadband network at the reference point T.

Solution 1: In this solution, FIG. 14 and FIG. 15 are schematic structural views of the system for interconnecting the BWA network with the OAN broadband network. The system includes the following entities.

A base station (BS) equipment is adapted to interconnect with the OAN broadband network at the reference point T through at least one pair of wired cables, provide access services for the wireless subscribers, process data packets or frames of the accessed wireless subscribers, output the processed data packets or frames to an AF equipment of the OAN broadband network, process the data packets or frames transferred from the AF equipment and transfer the processed data packets or frames to the wireless subscribers.

The AF equipment is adapted to interconnect with the BS equipment at the reference point T through at least one pair of wired cables, perform ONU access transformation process on the data packets or frames transferred from the BS equipment, transfer the processed data packets or frames to the ONU of the OAN broadband network through the wired cables, process data packets or frames transferred from the ONU through the wired cables and transfer the processed data packets or frames to the BS equipment.

A remote power supply unit is adapted to convert a mains input (e.g., 110V/220V AC) or a direct current (DC) input (e.g., −48V/−60V DC) into a high-voltage DC output (e.g., 270V DC), and remotely supply power to a remote BS equipment or to both the remote BS equipment and the AF equipment through the wired cables (e.g., one or more pairs of twisted pairs). When the remote power supply unit remotely supplies power merely to the BS, a schematic structural view of an implementation of the system according to the present invention is shown in FIG. 14. When the remote power supply unit remotely supplies power to both the BS and the AF equipment simultaneously, a schematic structural view of an implementation of the system according to the present invention is shown in FIG. 15. The distance of the remote power supply is relevant to core diameter, number of pairs for the wired cables, power consumption of an outdoor unit for the BS and output voltage of the remote power supply unit. Generally, the power supply distance of up to 2 km-5 km can be achieved.

In the system of the present invention, the BS equipment further includes a BS wireless processing unit, a BS wired service processing unit, a switching unit and a BS remote power supply unit.

The BS wireless processing unit is adapted to accomplish the access services of wireless subscribers, transfer the data packets or frames of the accessed wireless subscribers to the BS wired service processing unit, and transfer the data packets or frames transferred from the BS wired service processing unit to the wireless subscribers. The BS wireless processing unit includes one or more processing units, and each processing unit is formed by an antenna, a radio frequency (RF) processing module, a medium-frequency processing module, a base band processing module, a processing module of wireless data link layer and a processing module of layers over the wireless data link layer.

The BS wired service processing unit is adapted to interconnect with the OAN broadband network at the reference point T through one or more pairs of wired cables, process the data packets or frames transferred from the BS wireless processing unit, transfer the processed data packets or frames to the AF equipment of the OAN broadband network, process the data packets or frames transferred from the AF equipment and transfer the processed data packets or frames to the BS wireless processing unit. The BS wired service processing unit includes one or more processing units.

The switching unit is adapted to exchange the data packets or frames between each BS wireless processing unit and each BS wired service processing unit. When only one BS wireless processing unit and only one BS wired service processing unit exist, the switching unit may be omitted. In a mode based on a Layer 3 routing, the switching unit is an IP switching unit, and in a mode based on a Layer 2 bridging, the switching unit is a Layer 2 switching unit.

The BS remote power supply unit is adapted to convert the high-voltage DC (e.g., 270V DC) transferred from the remote power supply unit or the AF remote power supply unit of the AF equipment into the low-voltage DC to locally supply power to a power supply unit of the BS equipment, or relay the received the high-voltage DC to remotely supply power to remote BS equipments in the next tier through wired cables. This unit also supports the intercommunication with the AF equipment or the remote power supply unit to serve as an out-band management channel for the BS, thereby realize surveillance alarm function during normal operations and system failures, which thus is convenient for the equipment management, fault location, and remote maintenance.

In the system of the present invention, the AF equipment further includes an AF wired service processing unit, a wired service processing unit and an AF remote power supply unit.

The AF wired service processing unit is adapted to interconnect with the BS equipment at the reference point T through at least one pair of wired cables, process data packets or frames from the wired service processing unit interoperated with the ONU, transfer the processed data packets or frames to the BS equipment, process data packets or frames transferred from the BS equipment and transfer the processed data packets or frames to the wired service processing unit interoperated with ONU.

The wired service processing unit interoperated with the ONU is adapted to perform an ONU access transformation process on the data packets or frames transferred from the AF wired service processing unit, transfer the processed data packets or frames to the ONU of the OAN broadband network, process the data packets or frames transferred from the ONU of the OAN broadband network and transfer the processed data packets or frames to the AF wired service processing unit.

The AF remote power supply unit is adapted to convert the mains input (e.g., 110V/220V AC) or the DC input (e.g., −48V/−60V DC) into the high-voltage DC (e.g., 270V DC) to remotely supply power to remote BS equipment through wired cables (e.g., one or more pairs of twisted pairs). The distance of the remote power supply is relevant to the core diameter, number of pairs for the wired cables, power consumption of the outdoor unit for the BS, and output voltage of the remote power supply unit. Generally, the power supply distance of up to 2 km-5 km can be achieved. Alternatively, the AF remote power supply unit is adapted to convert the high-voltage DC (e.g., 270V DC) from the remote power supply unit into the low-voltage DC to locally supply power to the power supply unit of the AF equipment.

Figure 16:
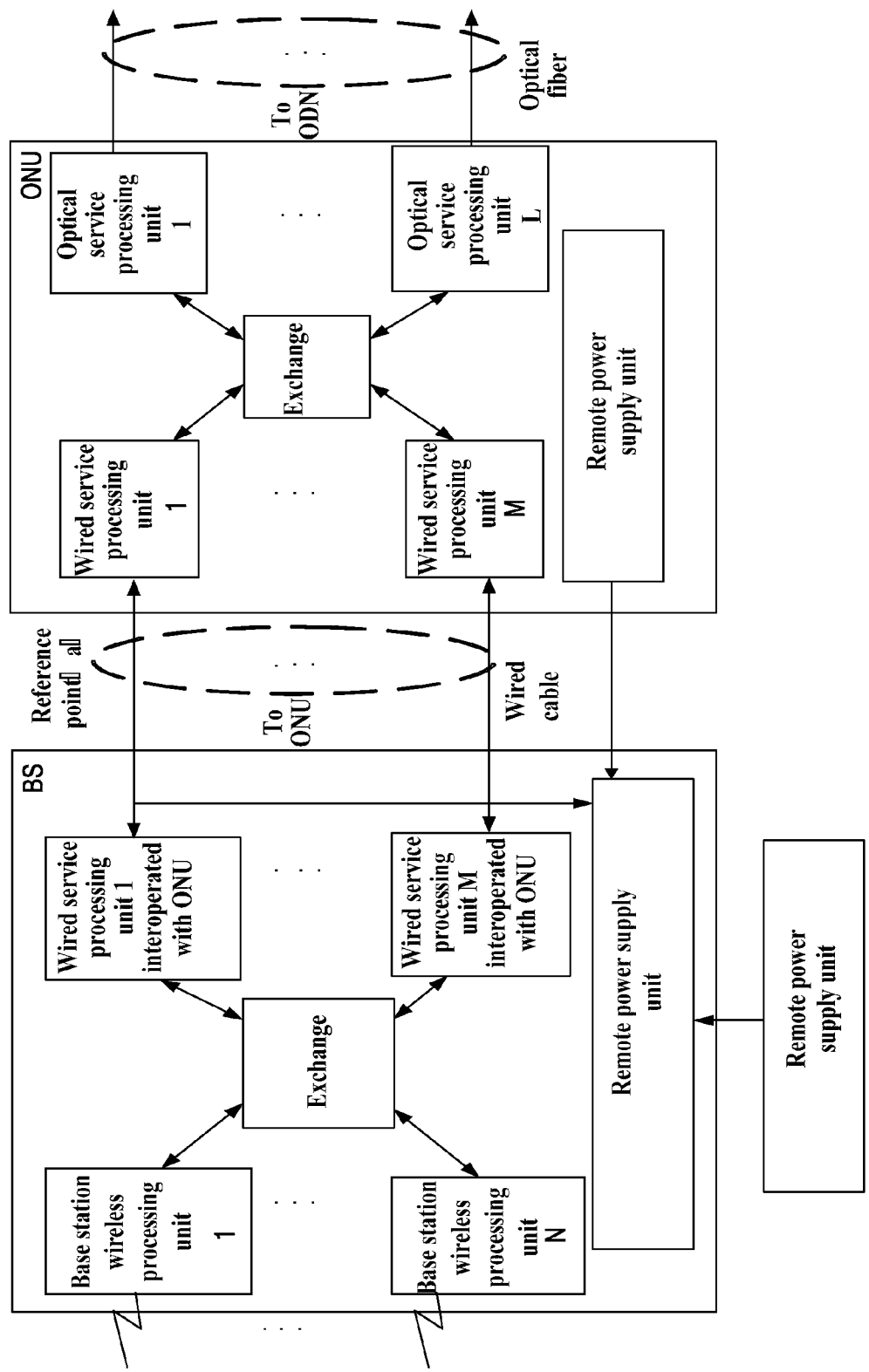
Figure 17:
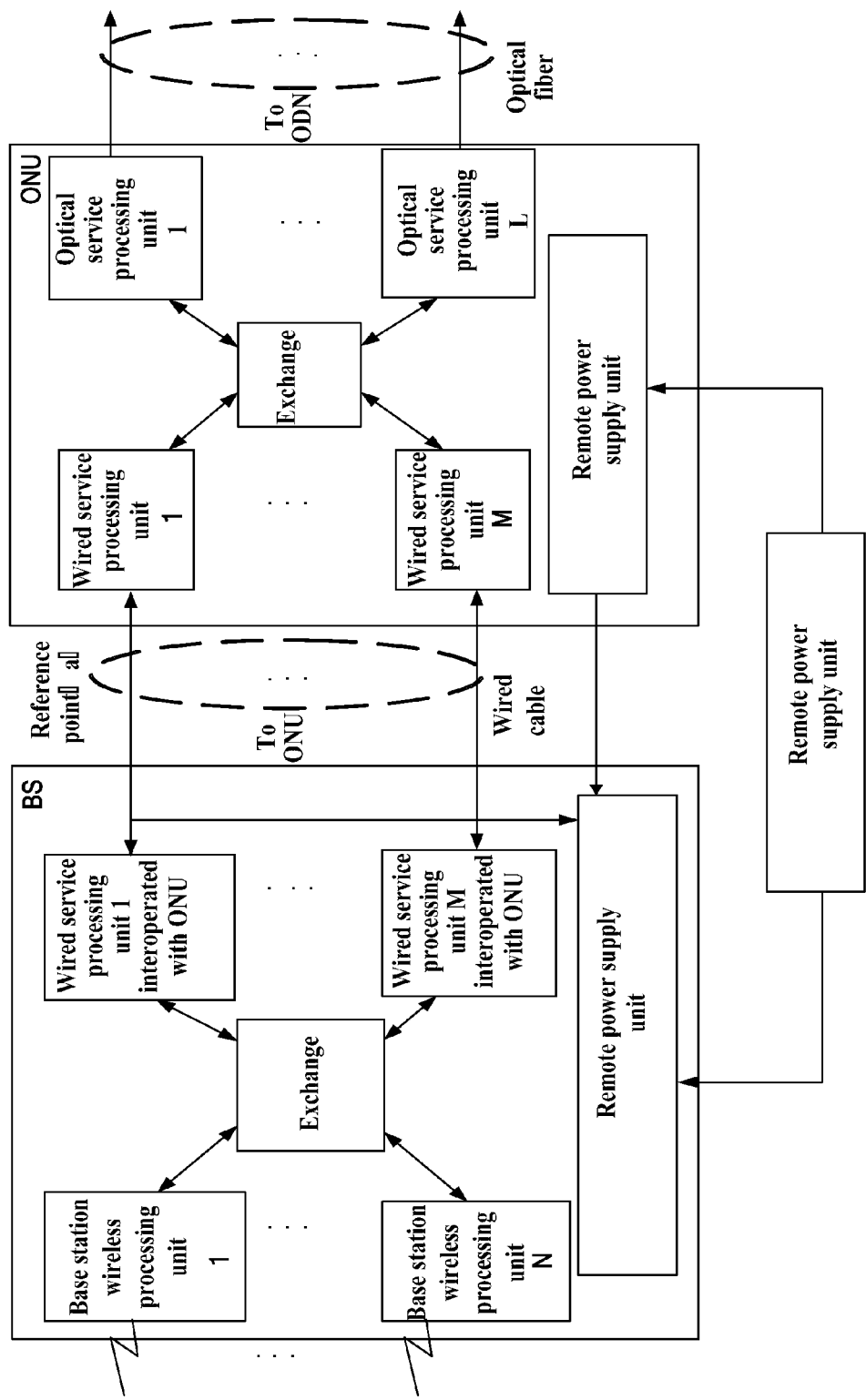

Solution 2: In this solution, FIG. 16 and FIG. 17 are schematic structural views of the system for interconnecting the BWA network with the OAN broadband network. The system includes the following modules.

A BS equipment is adapted to interconnect with the OAN broadband network at the reference point a through at least one pair of wired cables. The BS equipment is integrated with an AF function and is adapted to provide access services for the wireless subscribers, perform an ONU access transformation process on the data packets or frames of the accessed wireless subscribers and output the processed data packets or frames to ONU equipment of the OAN broadband network, process the data packets or frames transferred from the ONU equipment and transfer the processed data packets or frames to the wireless subscribers.

The ONU equipment is adapted to interconnect with the BS equipment at the reference point a through at least one pair of wired cables, process the data packets or frames transferred from the BS equipment, transfer the processed data packets or frames to the ODN of the OAN broadband network through the wired cables, process the data packets or frames transferred from the ODN through the wired cables and transfer the processed data packets or frames to the BS equipment.

A remote power supply unit is similar to the remote power supply unit in Solution 1, and is adapted to remotely supply power to remote BS equipment or to both the remote BS equipment and the ONU equipment simultaneously. When the remote power supply unit remotely supplies power merely to the BS, a schematic structural view of an implementation of the system according to the present invention is shown in FIG. 16. When the remote power supply unit remotely supplies power to both the BS and the ONU equipment simultaneously, a schematic structural view of an implementation of the system according to the present invention is shown in FIG. 17.

The BS equipment further includes a BS wireless processing unit, a wired service processing unit, a BS switching unit and a BS remote power supply unit.

The BS wireless processing unit is adapted to accomplish the access services of the wireless subscribers, transfer the data packets or frames of the wireless subscribers to the wired service processing unit interoperated with the ONU and transfer the data packets or frames transferred from the wired service processing unit interoperated with ONU to the wireless subscribers.

The wired service processing unit interoperated with the ONU is adapted to interconnect with the OAN broadband network at the reference point a through at least one pair of wired cables, perform an ONU access transformation process on the data packets or frames transferred from the BS wireless processing unit, transfer the processed data packets or frames to the ONU of the OAN broadband network, process the data packets or frames transferred from the ONU and transfer the processed data packets or frames to the BS wireless processing unit.

The BS switching unit is adapted to exchange the data packets or frames between each BS wireless processing unit and each wired service processing unit interoperated with the ONU. When only one BS wireless processing unit and only one wired service processing unit interoperated with the ONU exist, the switching unit may be omitted.

The BS remote power supply unit is adapted to convert the high-voltage DC transferred from the remote power supply unit or the ONU remote power supply unit of the ONU equipment into the low-voltage DC to locally supply power to the power supply unit of the BS equipment, or relay the received high-voltage DC to remotely supply power to the remote BS equipment in the next tier through wired cables. Similarly, this unit also supports the intercommunication with the ONU equipment or the remote power supply unit, so as to serve as an out-band management channel for the BS.

In the system of the present invention, the ONU equipment further includes an ONU wired service processing unit, an optical service processing unit, an ONU switching unit and an ONU remote power supply unit.

The ONU wired service processing unit is adapted to interconnect with the BS equipment at the reference point a through at least one pair of wired cables, process the data packets or frames transferred from the optical service processing unit, transfer the processed data packets or frames to the BS equipment, process the data packets or frames transferred from the BS equipment and transfer the processed data packets or frames to the optical service processing unit.

The optical service processing unit is adapted to process the data packets or frames transferred from the ONU wired service processing unit, transfer the processed data packets or frames to the ODN of the OAN broadband network, process data packets or frames transferred from the ODN of the OAN broadband network and transfer the processed data packets or frames to the ONU wired service processing unit.

The ONU switching unit is adapted to exchange the data packets or frames between each ONU wired service processing unit and each optical service processing unit. When only one ONU wired service processing unit and only one optical service processing unit exit, the ONU switching unit may be omitted.

The ONU remote power supply unit is adapted to convert the mains input (e.g., 110V/220V AC) or the DC input (e.g., −48V/−60V DC) into the high-voltage DC (e.g., 270V DC) to remotely supply power to remote BS equipment through wired cables (e.g., one or more pairs of twisted pairs). The distance of the remote power supply is relevant to the core diameter, number of pairs for the wired cables, power consumption of the outdoor unit for the BS, and output voltage of the remote power supply equipment. Generally, the power supply distance of up to 2 km-5 km can be achieved. Alternatively, the ONU remote power supply unit is adapted to convert the high-voltage DC (e.g., 270V DC) from the remote power supply unit into the low-voltage DC to locally supply power to the power supply unit of the ONU equipment.

Figure 18:
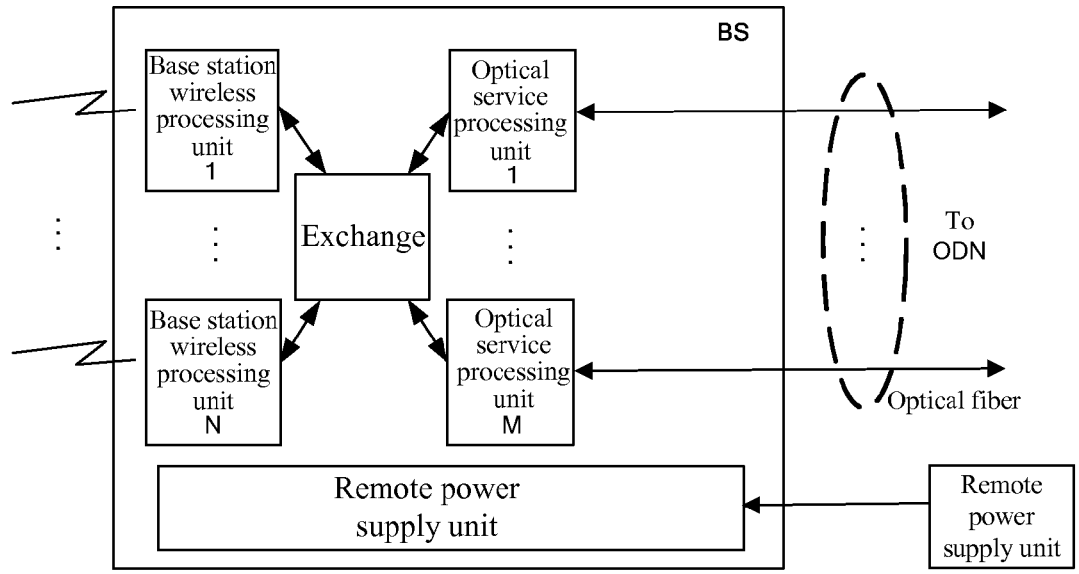
FIG. 18 is a structural view of a system for interconnecting the BWA network with the OAN broadband network at the reference point ODN.

Solution 3: FIG. 18 is a schematic structural view of the system for interconnecting the BWA network with the OAN broadband network. The system includes the following modules.

A BS equipment is adapted to interconnect with the OAN broadband network at the reference point ODN through at least one pair of wired cables. The BS equipment is integrated with AF and ONU functions and is adapted to accomplish the access services of wireless subscribers, convert the data packets or frames of the accessed wireless subscribers into a format suitable for optical transmission (e.g., the format of EPON or GPON), output the processed data packets or frames to an ODN equipment of the OAN broadband network, process the data packets or frames transferred from the ODN equipment and transfer the processed data packets or frames to the wireless subscribers.

The ODN equipment is adapted to interconnect with the BS equipment at the reference point ODN through at least one pair of wired cables, process the data packets or frames transferred from the BS equipment, transfer the processed data packets or frames to the OLT of the OAN broadband network, process the data packets or frames transferred from the OLT and transfer the processed data packets or frames to the BS equipment.

A remote power supply unit is adapted to remotely supply power to the remote BS equipment.

In the system of the present invention, the BS equipment further includes a BS wireless processing unit, an optical service processing unit, a BS switching unit and a BS remote power supply unit.

The BS wireless processing unit is adapted to accomplish the access services of the wireless subscribers, transfer the data packets or frames of the accessed wireless subscribers to the optical service processing unit and transfer the data packets or frames transferred from the optical service processing unit to the wireless subscribers.

The optical service processing unit is adapted to interconnect with the OAN broadband network at the reference point ODN through at least one pair of wired cables, process the data packets or frames transferred from the BS wireless processing unit to make the data packets or frames suitable for optical transmission, transfer the processed data packets or frames to the ODN equipment of the OAN broadband network, process the data packets or frames transferred from the ODN equipment and transfer the processed data packets or frames to the BS wireless processing unit.

The BS switching unit is adapted to exchange data packets or frames between each BS wireless processing unit and each optical service processing unit. When only one BS wireless processing unit and only one optical service processing unit exist, the BS switching unit may be omitted.

The BS remote power supply unit is adapted to convert a high-voltage DC transferred from the remote power supply unit into a low-voltage DC to locally supply power to a power supply unit of the BS equipment, or relay the received high-voltage DC to remotely supply power to the remote BS equipment in the next tier through wired cables. This unit also supports the intercommunication with the ODN equipment or the remote power supply unit to serve as an out-band management channel for the BS.

Figure 19:
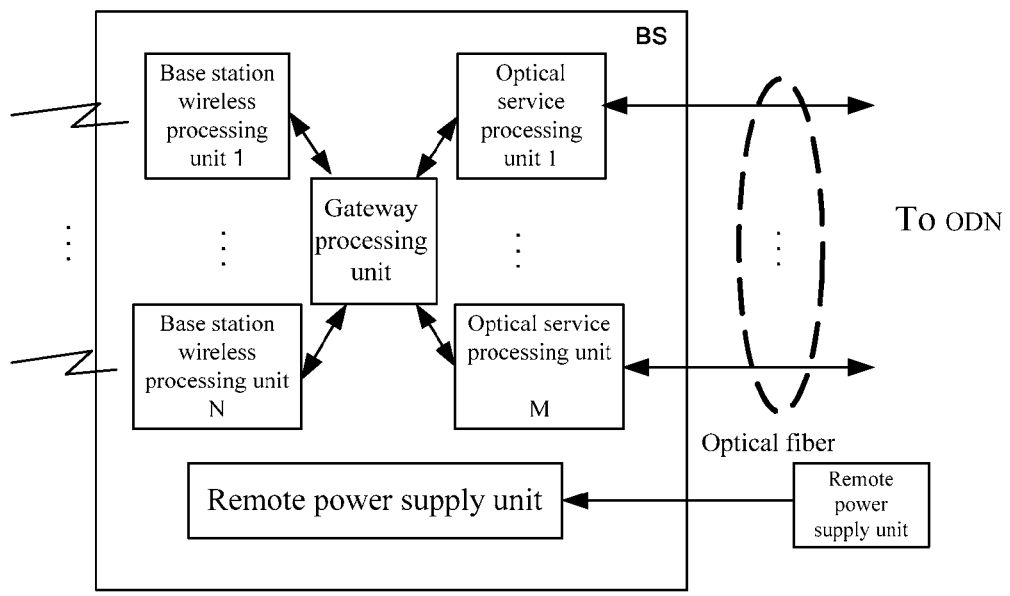
FIG. 19 is a schematic view of the system for interconnecting the WiMAX 802.16e network with the OAN broadband network at the reference point ODN.

Solution 4: FIG. 19 is a schematic view of this interconnection solution, and the system includes the following function entities.

A BS equipment is adapted to interconnect with the OAN broadband network at the reference point ODN through at least one pair of wired cables. The BS equipment is integrated with the AF, the ONU and the ASN Gateway functions, and is adapted to accomplish the access services of wireless subscribers, convert the data packets or frames of the accessed wireless subscribers into a format suitable for optical transmission (e.g., the format of EPON or GPON) and output the processed data packets or frames to an ODN equipment of the OAN broadband network, process the data packets or frames transferred from the ODN equipment and transfer the processed data packets or frames to the wireless subscribers.

The ODN equipment is adapted to interconnect with the BS equipment at the reference point ODN through at least one pair of wired cables, process the data packets or frames transferred from the BS equipment and then transfer the processed data packets or frames to the OLT of the OAN broadband network, process the data packets or frames transferred from the OLT and transfer the processed data packets or frames to the BS equipment.

A remote power supply unit is adapted to remotely supply power to the remote BS equipment.

In the system of the present invention, the BS equipment further includes a BS wireless processing unit, an optical service processing unit, a gateway processing unit and a BS remote power supply unit.

The BS wireless processing unit is adapted to accomplish the access services of the wireless subscribers, transfer the data packets or frames of the accessed wireless subscribers to the gateway processing unit and transfer the data packets or frames transferred from the gateway processing unit to the wireless subscribers.

The optical service processing unit is adapted to interconnect with the OAN broadband network at the reference point ODN through at least one pair of wired cables, process the data packets or frames transferred from the gateway processing unit to make the data packets or frames suitable for optical transmission, transfer the processed data packets or frames to the ODN equipment of the OAN broadband network, process data packets or frames transferred from the ODN equipment and transfer the processed data packets or frames to the gateway processing unit.

Figure 20:
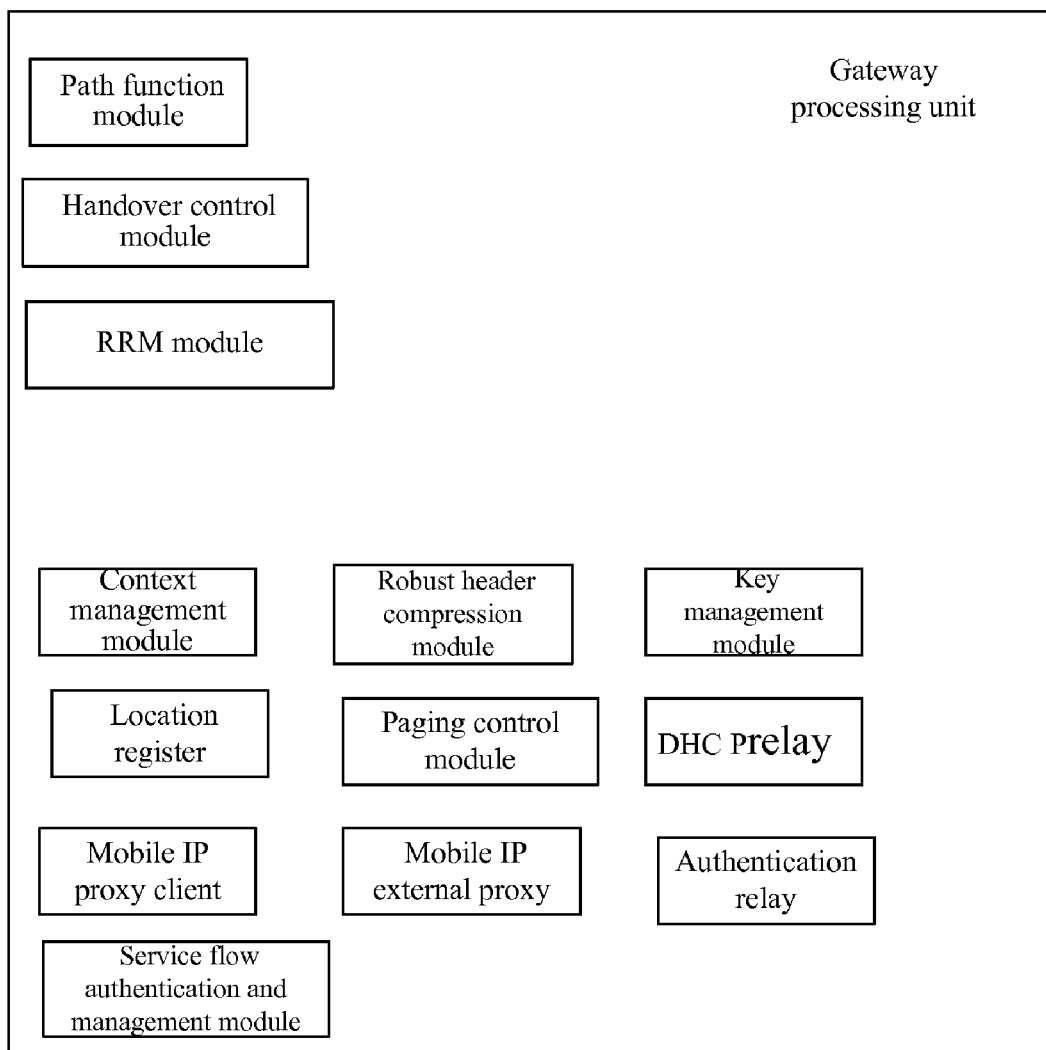
FIG. 20 is a schematic structural view of a gateway processing unit.

The gateway processing unit is adapted to route the data packets or frames between each BS wireless processing unit and each optical service processing unit to accomplish functions such as network handover, location register, service flow classification, and radio resource allocation and management for the wireless subscribers. The structure of the gateway processing unit is shown in FIG. 20, which mainly includes a handover control module, a path function module, and a radio resource management (RRM) module. The handover control module is adapted to control the network handover of wireless subscribers, and the RRM module is adapted to allocate and manage the radio resource of the wireless subscribers.

In addition to the above modules, the gateway processing unit may optionally include a location register, a service flow authentication and management module, a context management module, a robust header compression module, a key management module, a paging control module, a dynamic host configuration protocol (DHCP) relay, a mobile IP external proxy, a mobile IP proxy client, and an authentication relay. The location register is adapted to register location information of the wireless subscribers. The service flow authentication and management module is adapted to classify service flow of the wireless subscribers, so as to guarantee quality of service (QoS). The context management module is adapted to realize context management. The robust header compression module is adapted to compress a protocol header to increase transmission efficiency of the protocol header. The key management module is adapted to distribute and manage keys required for authentication under a security architecture. The paging control module is adapted to control and proxy paging messages sent by a mobile terminal. The DHCP relay is adapted to relay a packet of DHCP to enable the packet to reach a corresponding DHCP server. The mobile IP external proxy is adapted to realize an external proxy function in a mobile IP protocol to establish a tunnel with a home agent. The mobile IP proxy client is adapted to realize a function of a client in a proxy mobile IP protocol. The authentication relay is adapted to relay an authentication request of a client.

The BS remote power supply unit in the BS equipment is adapted to convert the high-voltage DC transferred from the remote power supply unit into the low-voltage DC to locally supply power to the power supply unit of the BS equipment, or remotely supply power to the remote BS equipment in the next tier. This unit also supports the intercommunication with the ODN equipment or the remote power supply unit to serve as an out-band management channel for the BS.

Figure 21:
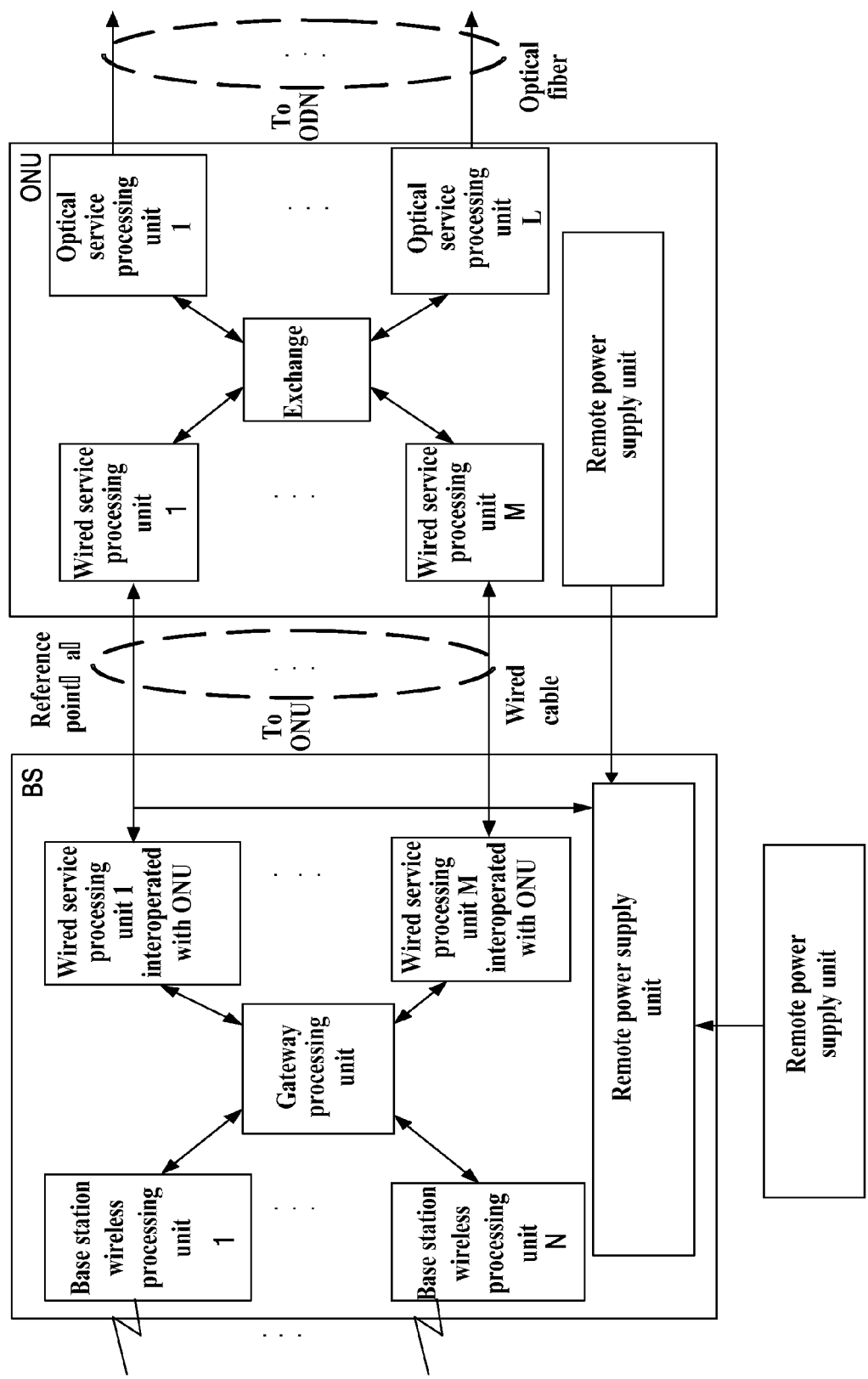
Figure 22:
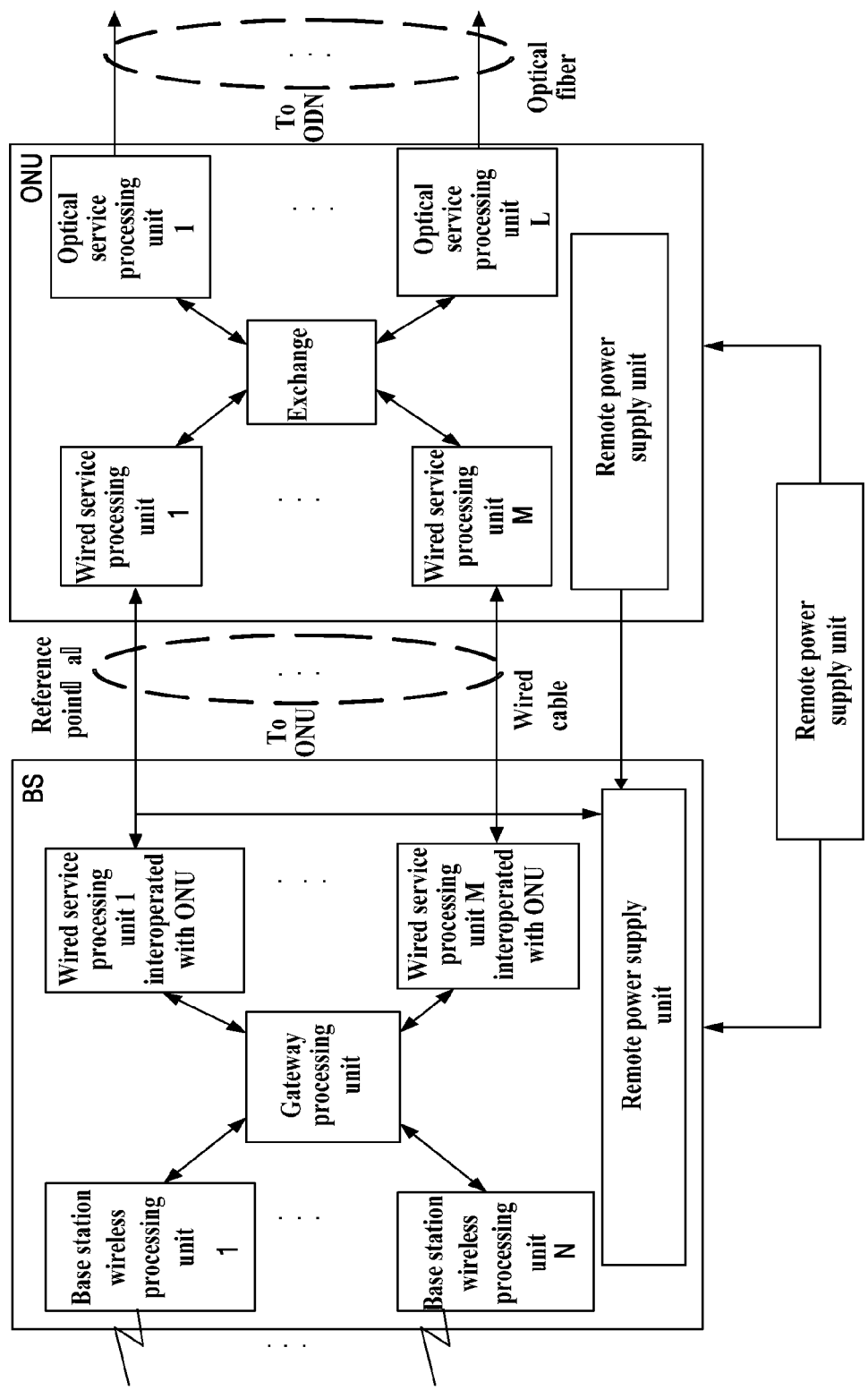

Solution 5: FIG. 21 and FIG. 22 are schematic views of this interconnection solution, and the system includes the following modules.

A BS equipment is adapted to interconnect with the OAN broadband network at the reference point a through at least one pair of wired cables. The BS equipment is integrated with the AF and ASN Gateway functions and is adapted to accomplish the access services of wireless subscribers, perform an ONU access transformation process on the data packets or frames of the accessed wireless subscribers and output the processed data packets or frames to an ONU equipment of the OAN broadband network, process the data packets or frames transferred from the ONU equipment and transfer the processed data packets or frames to the wireless subscribers.

The ONU equipment is adapted to interconnect with the BS equipment at the reference point a through at least one pair of wired cables, process the data packets or frames transferred from the BS equipment, transfer the processed data packets or frames to an ODN of the OAN broadband network through the wired cables, process data packets or frames transferred from the ODN through the wired cables and transfer the processed data packets or frames to the BS equipment.

Figure 32:
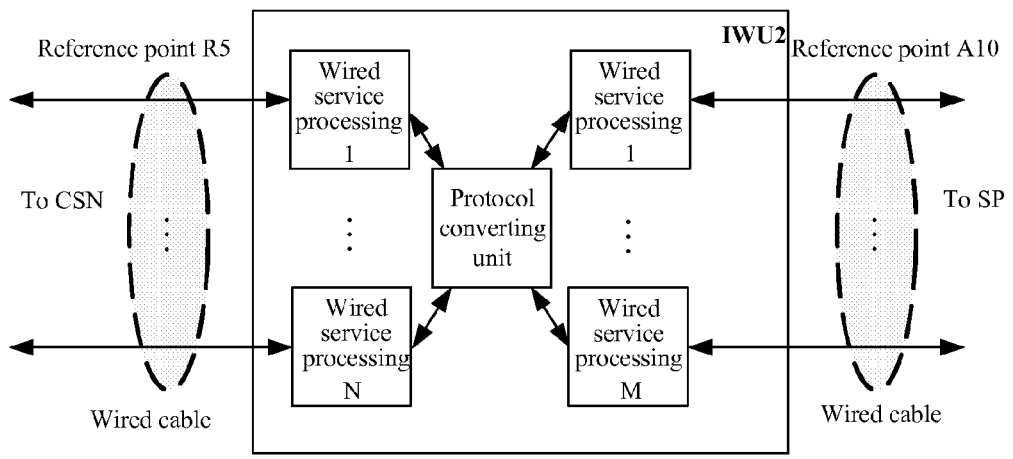
FIG. 32 is a schematic view of the system for interconnecting the WiMAX network with the DSL network through the IWU2.
Figure 33:
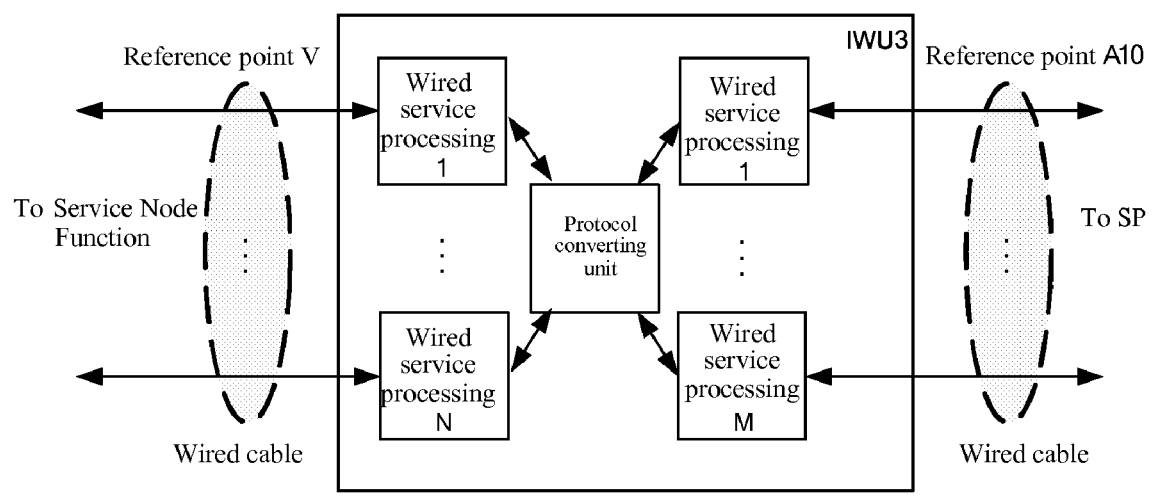
FIG. 33 is a schematic view of the system for interconnecting the DSL network with the OAN broadband network through the IWU3.

A remote power supply unit is adapted to remotely supply power to the remote BS equipment or to both the remote BS equipment and the ONU equipment simultaneously. When the remote power supply unit remotely supplies power merely to the BS, a schematic structural view of the system according to the present invention is shown in FIG. 32. When the remote power supply unit remotely supplies power to both the BS and the ONU equipment simultaneously, a schematic structural view of the system according to the present invention is shown in FIG. 33.

In the system of the present invention, the BS equipment further includes a BS wireless processing unit, a wired service processing unit, a gateway processing unit and a BS remote power supply unit.

The BS wireless processing unit is adapted to accomplish the access services of the wireless subscribers, transfer the data packets or frames of the accessed wireless subscribers to the gateway processing unit and transfer data packets or frames transferred from the gateway processing unit to the wireless subscribers.

The wired service processing unit interoperated with the ONU is adapted to interconnect with the OAN broadband network at the reference point a through at least one pair of wired cables, perform an ONU access transformation process on the data packets or frames transferred from the gateway processing unit, transfer the processed data packets or frames to the ONU of the OAN broadband network, process data packets or frames transferred from the ONU and transfer the processed data packets or frames to the gateway processing unit.

The gateway processing unit is adapted to route the data packets or frames between each BS wireless processing unit and each wired service processing unit interoperated with the ONU to accomplish functions such as network handover, location register, service flow classification, and radio resource allocation and management for the wireless subscribers. The structure of the gateway processing unit is shown in FIG. 20. The functions of modules included therein are as described above.

The BS remote power supply unit is adapted to convert the high-voltage DC (e.g., 270V DC) transferred from the remote power supply unit or an ONU remote power supply unit of the ONU equipment into the low-voltage DC to locally supply power to the power supply unit of the BS equipment, or relay the received high-voltage DC to remotely supply power to the remote BS equipment in the next tier through wired cables. This unit also supports the intercommunication with the ONU equipment or the remote power supply unit to serve as an out-band management channel for the BS.

In the present invention, the ONU equipment further includes an ONU wired service processing unit, an optical service processing unit, an ONU switching unit and an ONU remote power supply unit.

The ONU wired service processing unit is adapted to interconnect with the BS equipment at the reference point a through at least one pair of wired cables, process the data packets or frames transferred from the optical service processing unit, transfer the processed data packets or frames to the BS equipment, process the data packets or frames transferred from the BS equipment and transfer the processed data packets or frames to the optical service processing unit.

The optical service processing unit is adapted to process the data packets or frames transferred from the ONU wired service processing unit, transfer the processed data packets or frames to the ODN of the OAN broadband network, process the data packets or frames transferred from the ODN of the OAN broadband network and transfer the processed dada packets or frames to the ONU wired service processing unit.

The ONU switching unit is adapted to exchange the data packets or frames between each ONU wired service processing unit and each optical service processing unit. When only one ONU wired service processing unit and only one optical service processing unit exist, the ONU switching unit may be omitted.

The ONU remote power supply unit is adapted to remotely supply power to the remote BS equipment; or convert the high-voltage DC from the remote power supply unit into the low-voltage DC to locally supply power to the power supply unit of the ONU equipment.

II. The present invention further provides a first type of implementation solutions for interconnecting the BWA network with the OAN broadband network and the DSL network.

In this type of solutions, the present invention interconnects the BWA network, such as the WiMAX network, with the OAN broadband network at the reference point T, the reference point a and the reference point ODN, and then interconnects the BWA network and the OAN broadband network with the DSL network at the reference point V; alternatively, the present invention interconnects the BWA network, such as the WiMAX network, and the OAN broadband network respectively with the DSL network at the reference point V to realize the interconnection and intercommunication among the three networks.

By taking the WiMAX network as an example for the BWA network, the present invention provides four implementation solutions for interconnecting the WiMAX network, the DSL network, and the OAN broadband network, but the present invention is not limited to the following four solutions in practical applications. The four implementation solutions are respectively described herein below.

Figure 23A:
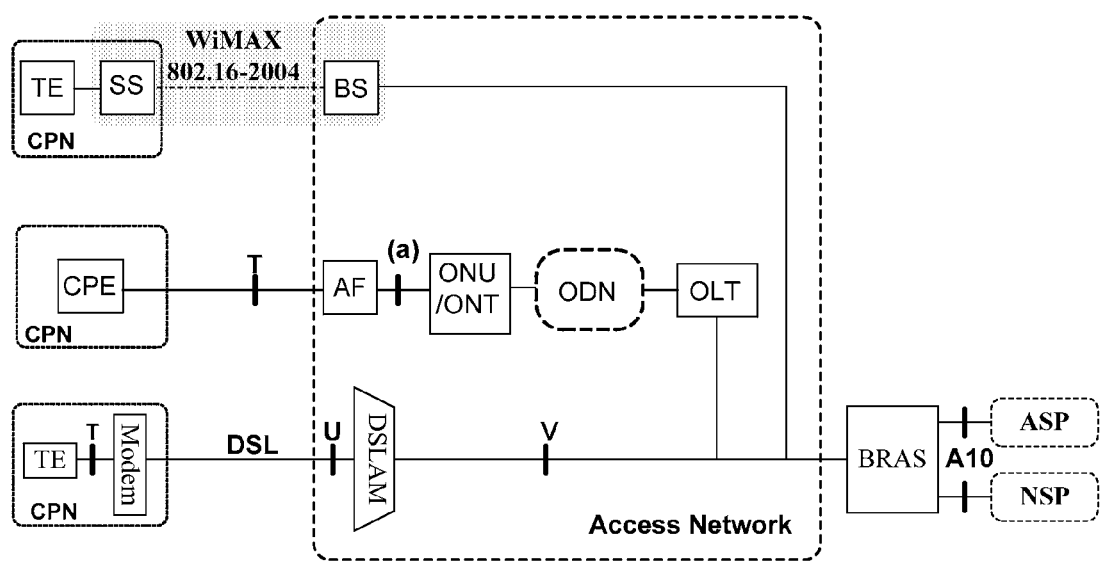
FIG. 23A and FIG. 23B are schematic views of respectively interconnecting the WiMAX 802.16-2004 network and the OAN broadband network with the DSL network at the reference point V.
Figure 23B:
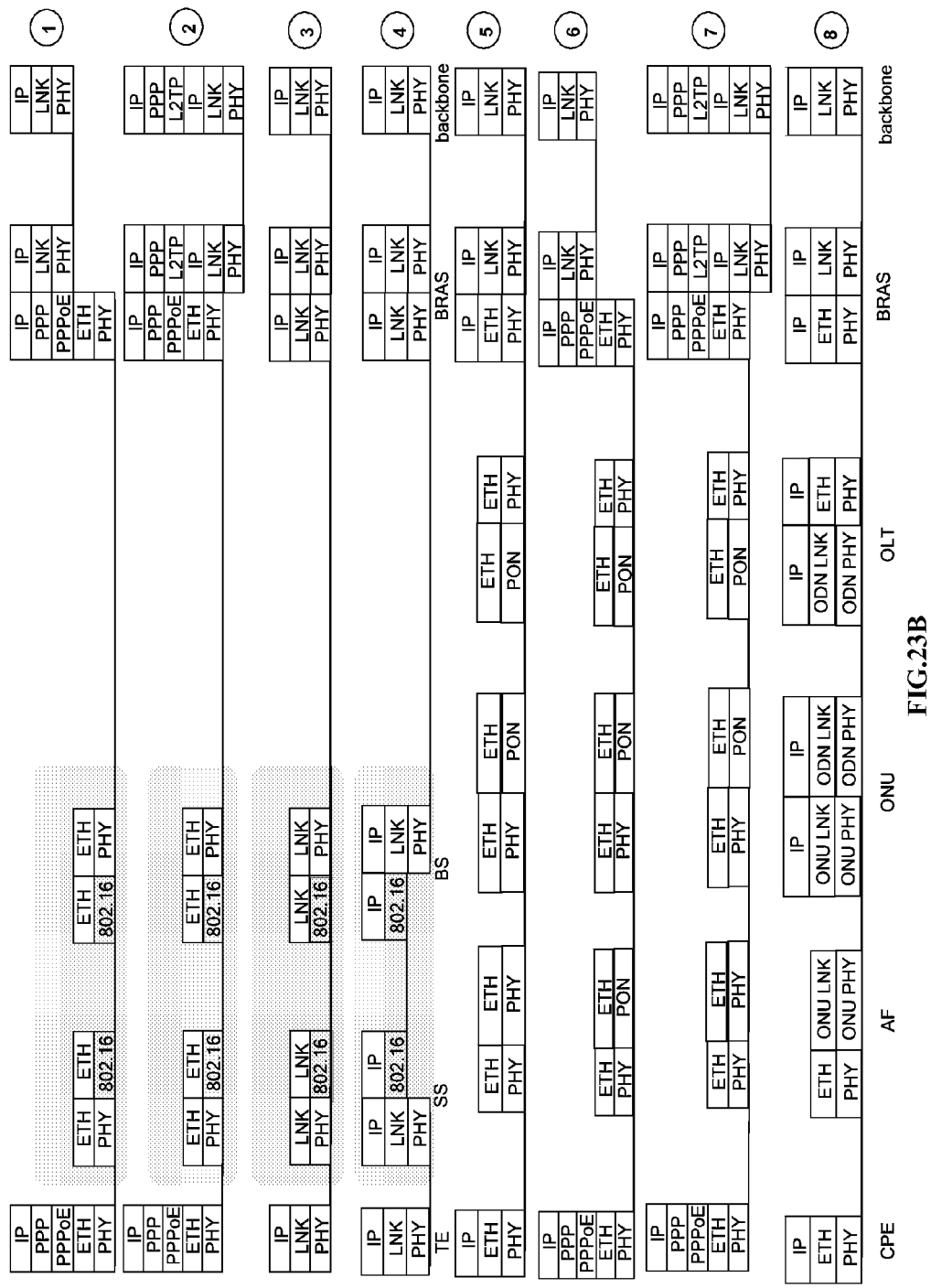

Solution 1: FIG. 23A and 23B are schematic views of an implementation solution for interconnecting the WiMAX 802.16-2004 and the OAN broadband network respectively with the DSL network at the reference point V, which is described in detail as follows.

It belongs to a tight-coupling solution to interconnect the WiMAX 802.16-2004 network and the OAN broadband network respectively with the DSL network at the reference point V of the DSL network. This solution includes four types of modes, and the protocol stacks of the four types of modes in a path of TE-SS-BS-BRAS-SP are respectively shown in FIG. 23A and FIG. 23B. This path is an end-to-end path for interconnecting the WiMAX 802.16-2004 network, the DSL network, and the OAN network. This interconnection solution is mainly applicable for fixed access applications, but the WiMAX subscribers should have certain nomadic capabilities.

In this solution, the WiMAX 802.16-2004 network directly uses a BRAS of the DSL network to perform authentication. The OAN network may also use the BRAS to access the DSL network. In terms of security, the 802.16 sub-layer PKM security architecture is employed between the SS and the BS. The sub-layer PKM security architecture is employed between the SS and the BS, and the security architecture of the PON technology is employed between the ONU and the OLT. The four types of modes in this solution are respectively described herein below.

The first type of mode includes Mode 1, Mode 2 and Mode 3. In the path of TE-SS-BS-BRAS-SP, the 802.16-2004 Layer 2 wireless access technology is employed between the SS and the BS to replace wired access of the OAN network and the DSL network or to serve as wireless extension of the wired access of the OAN network and the DSL network, and the Layer 2 wireless access technology supports an ETH CS at an airlink. In Mode 2, several service providers (SP) share the access network, and the BRAS accesses the SP through employing a tunneling technology, e.g. a Layer 2 tunneling protocol (L2TP) or a multi-protocol label switching (MPLS) tunneling protocol. In Mode 1 and Mode 2, the PPP over Ethernet is supported between the BRAS and the TE to serve as a link protocol and as a mechanism for address allocation and authentication, and the BRAS provides the capability of controlling and managing the terminal configuration and connection. Mode 1 and Mode 2 are applicable for pure data services.

The second type of mode includes Mode 4. In the path of TE-SS-BS-BRAS-SP, the TE, SS, BS, and BRAS are all Layer 3 network elements, a 802.16-2004 Layer 3 wireless access technology is employed between the SS and the BS, and the Layer 3 wireless access technology supports an IP CS at the airlink.

The third type of mode includes Mode 5, Mode 6, and Mode 7, which is a solution for the OAN network to access the DSL network. In a path of CPE-AF-ONU-OLT-BRAS-SP, the subscriber accesses the DSL network in a manner of IP or PPPOE, uses the BRAS of the DSL network to perform address allocation and authentication, provide a terminal configuration and ability of connection control and management.

The fourth mode includes Mode 8, which is a solution for the OAN network to access the DSL network. In the path of CPE-AF-ONU-OLT-BRAS-SP, the ONU and the OLT are both Layer 3 network elements.

Solution 2: The WiMAX network is interconnected with the OAN broadband network at the reference point ODN, and the WiMAX network and the OAN broadband network are interconnected with the DSL network at the reference point V, which is described in detail as follows.

Figure 24:
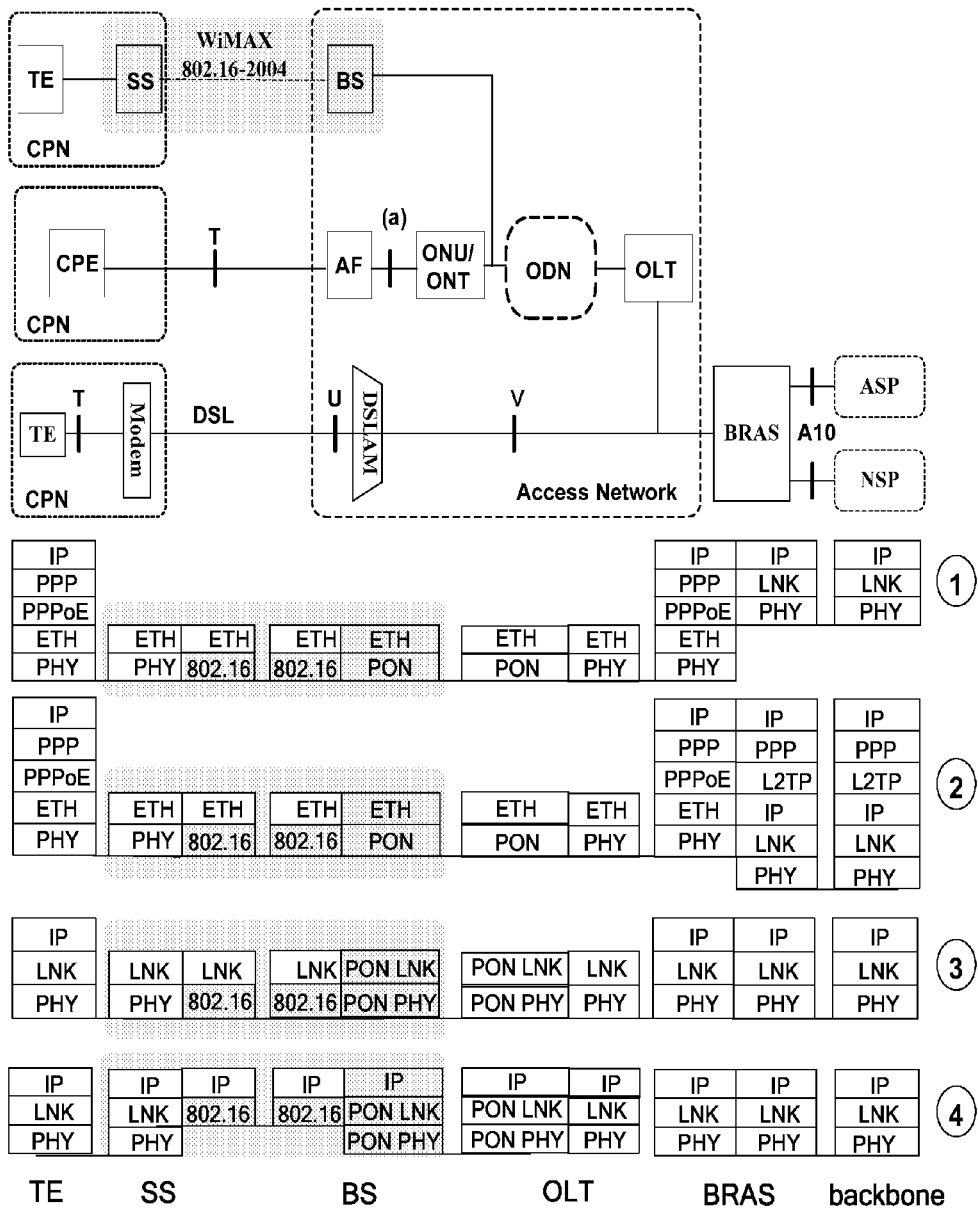
FIG. 24 is a schematic view of the WiMAX 802.16-2004 network interconnected with the OAN broadband network at the reference point ODN, and then interconnected with the DSL broadband network at the reference point V in the DSL broadband network.

An implementation solution for interconnecting the WiMAX 802.16-2004 network with the OAN broadband network at the reference point ODN, and then interconnecting the WiMAX 802.16-2004 network and the OAN broadband network with the DSL broadband network at the reference point V in the DSL broadband network is shown in FIG. 24, which belongs to a tight-coupling solution. The WiMAX 802.16-2004 network directly utilizes the existing optical network resources of the OAN, thus avoiding the additional wiring for connecting to the BRAS, thereby reducing the construction cost of the WiMAX access network. In this solution, the BS is integrated with the function of ONU. According to various WiMAX access modes, this interconnection solution includes two types of modes, and the protocol stacks thereof in a path of TE-SS-BS-OLT-BRAS-SP are respectively shown in FIG. 24. This path is an end-to-end path for interconnecting the WiMAX 802.16-2004 network, the DSL network, and the OAN network in this solution. This solution is mainly applicable for fixed access applications, but the WiMAX subscribers should have certain nomadic capabilities. The two types of modes in this solution are described below.

Mode 1, Mode 2, and Mode 3: In the path of TE-SS-BS-OLT-BRAS-SP, the 802.16-2004 Layer 2 wireless access technology is employed between the SS and the BS, and the BS directly accesses the ODN and accesses the BRAS in the DSL network by utilizing the existing optical resources of the OAN. The Layer 2 wireless access technology supports the ETH CS at the airlink. In Mode 2, several SPs share the access network, and the BRAS accesses the SP through employing a tunneling technology, e.g., L2TP or MPLS tunneling. In Mode 1 and Mode 2, the PPP over Ethernet is supported between the BRAS and the TE to serve as a link protocol and as a mechanism for address allocation and authentication, for controlling and managing the terminal configuration and connection. The Mode 1 and Mode 2 are applicable for pure data services.

Mode 4: In the path of TE-SS-BS-OLT-BRAS-SP, the TE, the SS, the BS, the OLT and the BRAS are all Layer 3 network elements. The 802.16-2004 Layer 3 wireless access technology is employed between the SS and the BS, and the Layer 3 wireless access technology supports the IP CS at the airlink.

Figure 25:
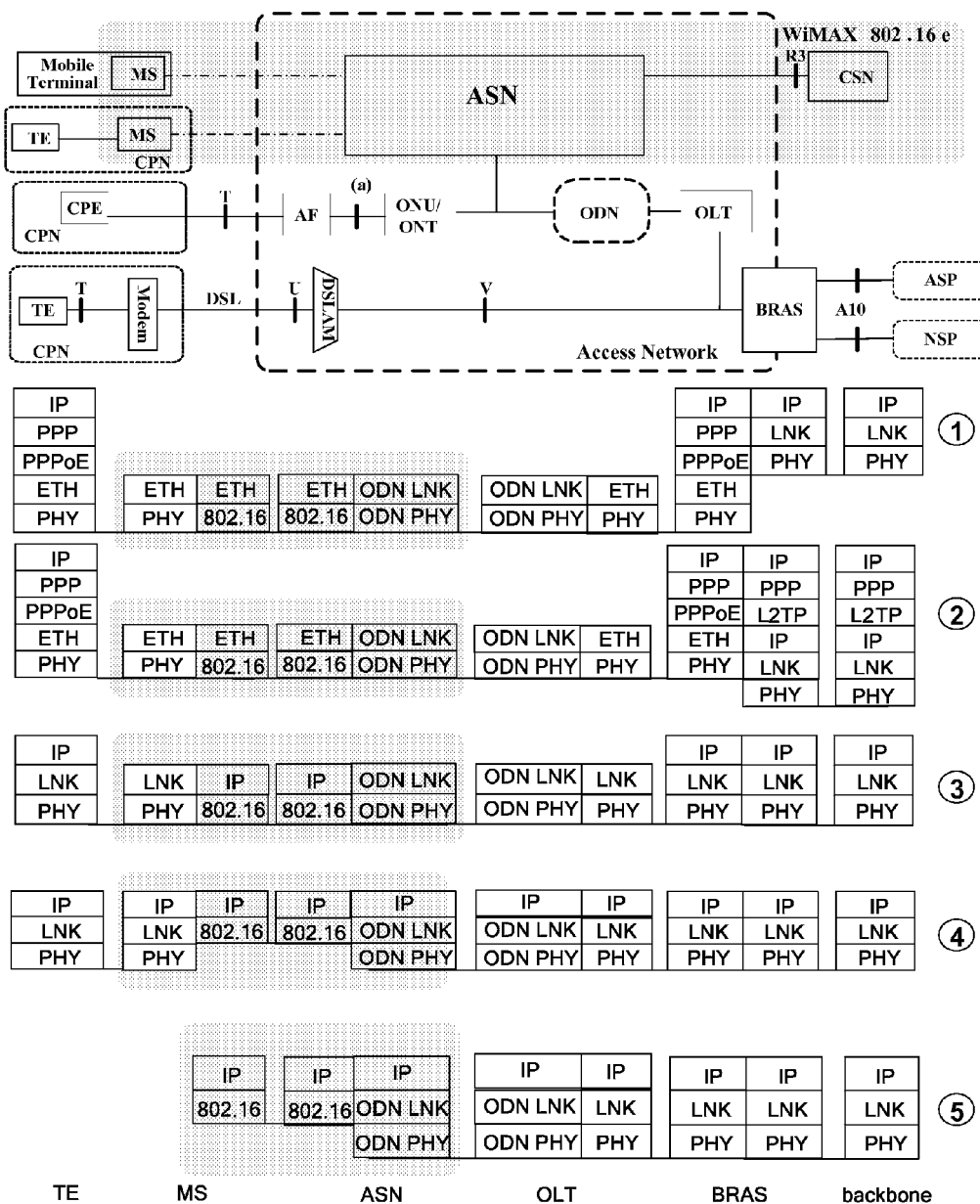
FIG. 25 is a schematic view of the WiMAX 802.16e network interconnected with the OAN broadband network at the reference point ODN, and then interconnected with the DSL broadband network at the reference point V in the DSL broadband network.

The implementation solution for interconnecting the WiMAX 802.16e network with the OAN broadband network at the reference point ODN, and interconnecting the WiMAX 802.16e network and the OAN broadband network with the DSL broadband network at the reference point V in the DSL broadband network is shown in FIG. 25, which belongs to a loose-coupling solution. The WiMAX 802.16e directly utilizes the already allocated optical network resources of the OAN, thus avoiding the additional wiring for connecting to the BRAS, thereby reducing the construction cost of the WiMAX access network. In this solution, the ASN is integrated with the function of ONU. According to various WiMAX access modes, this interconnection solution includes three types of modes, and the protocol stacks thereof in a path of TE-MS-ASN-OLT-BRAS-SP are respectively shown in FIG. 25. This path is an end-to-end path for interconnecting the WiMAX 802.16e network, the DSL network, and the OAN network in this solution. This solution is mainly applicable for fixed access applications, and may also support portable and mobile access applications to a certain extent, thereby supporting uniform accounting, customer care, and authentication. The three types of modes in this solution are described herein below.

The first type of mode includes Mode 1, Mode 2, and Mode 3. In the path of TE-MS-ASN-OLT-BRAS-SP, a 802.16e Layer 2 wireless access technology is employed between the MS and the BS, and the BS directly accesses the ODN and accesses the BRAS in the DSL network by utilizing the existing optical resources of the OAN. The Layer 2 wireless access technology supports an ETH CS at the airlink. In Mode 2, several SPs share the access network, and the BRAS accesses the SP through employing a tunneling technology, e.g., L2TP or MPLS tunneling. In Mode 1 and Mode 2, the PPP over Ethernet is supported between the BRAS and the TE to serve as a link protocol and as a mechanism for address allocation and authentication and provide a terminal configuration and ability of connection control and management. Mode 1 and Mode 2 are applicable for pure data services.

The second type of mode includes Mode 4. In the path of TE-MS-ASN-ONU-OLT-BRAS-SP, the TE, the MS, all network elements of the ASN, the OLT and BRAS are all Layer 3 network elements, a 802.16e Layer 3 wireless access technology is employed between the MS and the BS, and the Layer 3 wireless access technology supports an IP CS at the airlink.

The third type of mode includes Mode 5. In the path of MS-BS-ASN-BRAS-SP, a Layer 3 routing technology, e.g. IP Layer 3 routing is employed between the BRAS and the MS. Herein, the Layer 3 routing technology indicates that all network elements of the ASN, the MS, the OLT and the BRAS are all Layer 3 network elements, an access technology over the 802.16e Layer 3 wireless access technology is employed on an IP layer between the BS and the MS to replace wired access of the OAN and the DSL or to serve as a wireless extension of the wired access of the OAN and the DSL. The access technology over the 802.16e Layer 3 wireless access technology supports the IP CS at the airlink.

Solution 3: The WiMAX network is interconnected with the OAN broadband network at the reference point T, and then the WiMAX network and the OAN broadband network are interconnected with the DSL network at the reference point V, which is described in detail as follows.

Figure 26:
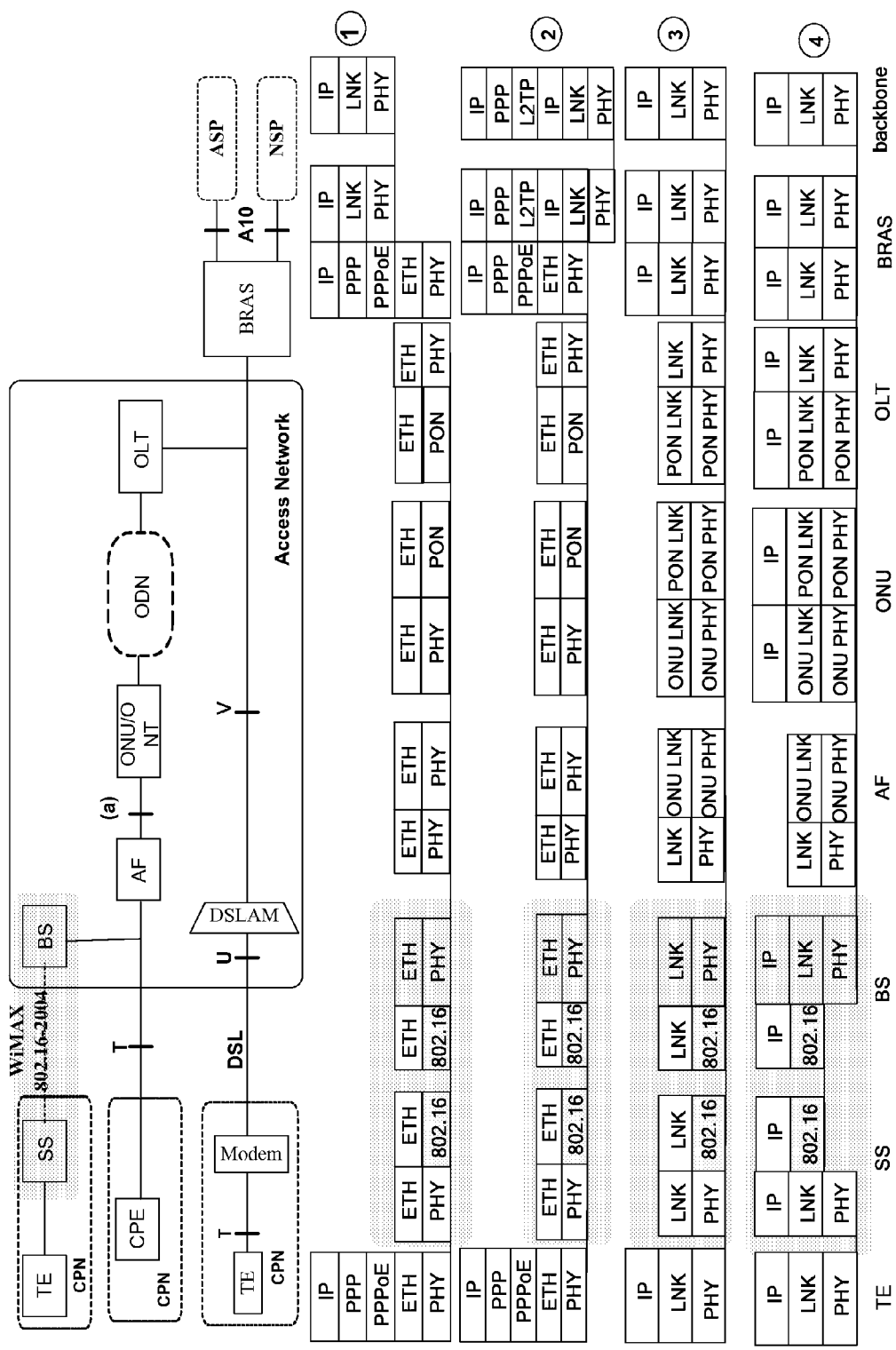
FIG. 26 is a schematic view of the WiMAX 802.16-2004 network interconnected with the OAN broadband network at the reference point T, and then interconnected with the DSL broadband network at the reference point V in the DSL broadband network.

The implementation solution for interconnecting the WiMAX 802.16-2004 network with the OAN broadband network at the reference point T, and interconnecting the WiMAX 802.16-2004 network and the OAN broadband network with the DSL broadband network at the reference point V in the DSL broadband network is shown in FIG. 26, which belongs to a tight-coupling solution. The WiMAX 802.16-2004 network directly utilizes the existing optical network resources of the OAN network, thus avoiding the additional wiring for connecting to the BRAS, thereby reducing the construction cost of the WiMAX access network. According to various WiMAX access modes, this interconnection solution includes two types of modes, and the protocol stacks thereof in a path of TE-SS-BS-AF-ONU-OLT-BRAS-SP are respectively shown in FIG. 26. This path is an end-to-end path for interconnecting the WiMAX 802.16-2004 network, the DSL network, and the OAN network in this solution. This solution is mainly applicable for fixed access applications, but the WiMAX subscribers should have certain nomadic capabilities.

The first type of mode includes Mode 1, Mode 2, and Mode 3. In the path of TE-SS-BS-ONU-OLT-BRAS-SP, the 802.16-2004 Layer 2 wireless access technology is employed between the SS and the BS, and the BS connects to the AF through the reference point T, accesses the ODN through the ONU and accesses the BRAS in the DSL network by utilizing the existing optical resources of the OAN. The Layer 2 wireless access technology supports the ETH CS at the airlink. In Mode 2, several SPs share the access network, and the BRAS accesses the SP through employing a tunneling technology, e.g., L2TP or MPLS tunneling. In Mode 1 and Mode 2, the PPP over Ethernet is supported between the BRAS and the TE to serve as a link protocol and as a mechanism for address allocation and authentication, provide a terminal configuration and ability of connection control and management. Mode 1 and Mode 2 are both applicable for pure data services.

The second type of mode includes Mode 4. In the path of TE-SS-BS-OLT-BRAS-SP, the TE, the SS, the BS, the ONU, the OLT and BRAS are all Layer 3 network elements, the 802.16-2004 Layer 3 wireless access technology is employed between the SS and the BS, and the Layer 3 wireless access technology supports the IP CS at the airlink.

Figure 27:
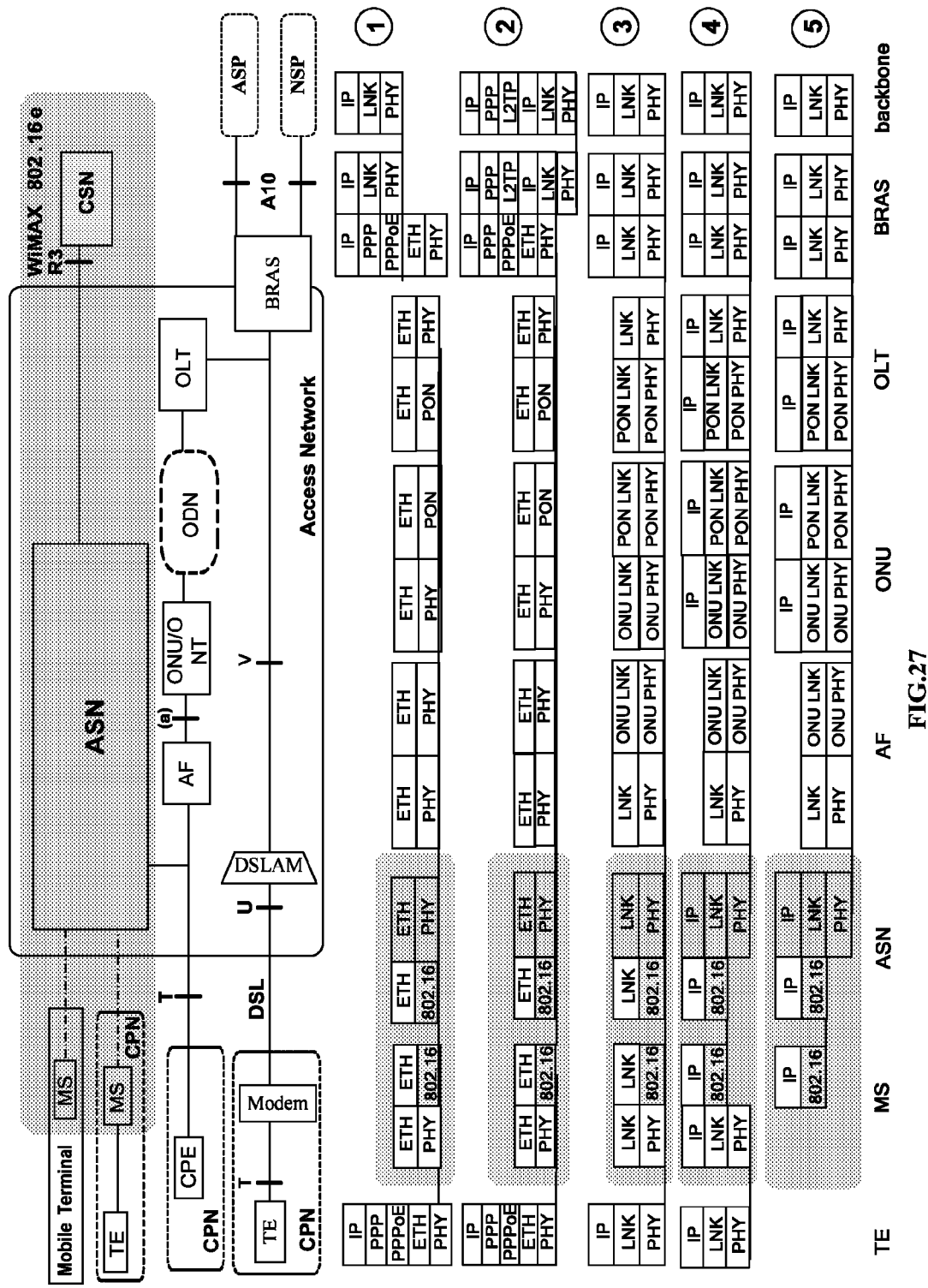
FIG. 27 is a schematic view of the WiMAX 802.16e network interconnected with the OAN broadband network at the reference point T, and then interconnected with the DSL broadband network at the reference point V in the DSL broadband network.

The implementation solution for interconnecting the WiMAX 802.16e network with the OAN broadband network at the reference point T, and interconnecting the WiMAX 802.16e network and the OAN broadband network with the DSL broadband network at the reference point V in the DSL broadband network is shown in FIG. 27, which belongs to a loose-coupling solution. The WiMAX 802.16e network accesses the ONU through the AF by utilizing the already allocated optical network resources of the OAN network, thus avoiding the additional wiring for connecting to the BRAS, thereby reducing the construction cost of the WiMAX access network. According to various WiMAX access modes, this interconnection solution includes three types of modes, and the protocol stacks thereof in a path of TE-MS-ASN-AF-ONU-OLT-BRAS-SP are respectively shown in FIG. 27. This path is an end-to-end path for interconnecting the WiMAX 802.16e network, the DSL network and the OAN network in this solution. This solution is mainly applicable for fixed access applications, and may also support portable and mobile access applications to a certain extent, thereby supporting uniform accounting, customer care and authentication. The three types of modes in this solution are described herein below.

The first type of mode includes Mode 1, Mode 2, and Mode 3. In the path of TE-MS-ASN-AF-ONU-OLT-BRAS-SP, the 802.16e Layer 2 wireless access technology is employed between the MS and the BS, and the BS accesses the ODN through the AF and ONU, and accesses the BRAS in the DSL network by utilizing the existing optical resources of the OAN. The Layer 2 wireless access technology supports the ETH CS at the airlink. In Mode 2, several SPs share the access network, and the BRAS accesses the SP through employing a tunneling technology, e.g., L2TP or MPLS tunneling. In Mode 1 and Mode 2, the PPP over Ethernet is supported between the BRAS and the TE to serve as a link protocol and as a mechanism for address allocation and authentication, provide a terminal configuration and ability of connection control and management. Mode 1 and Mode 2 are both applicable for pure data services.

The second type of mode includes Mode 4. In the path of TE-MS-ASN-AF-ONU-OLT-BRAS-SP, the TE, the MS, the ONU, the OLT, all network elements of the ASN and the BRAS are all Layer 3 network elements, the 802.16e Layer 3 wireless access technology is employed between the MS and the BS, and the Layer 3 wireless access technology supports the IP CS at the airlink.

The third type of mode includes Mode 5. In the path of MS-BS-ASN-AF-ONU-OLT-BRAS-SP, the Layer 3 routing technology, e.g., IP Layer 3 routing is employed between the BRAS and the MS. Herein, the Layer 3 routing technology indicates that all network elements of the ASN, the MS, the ONU, the OLT and the BRAS are all Layer 3 network elements, an access technology over the 802.16e Layer 3 wireless access technology is employed on the IP layer between the BS and the MS to replace wired access of the OAN and the DSL or to serve as a wireless extension of the wired access of the OAN and the DSL and the access technology over the 802.16e Layer 3 wireless access technology supports the IP CS at the airlink.

Solution 4: The WiMAX network is interconnected with the OAN broadband network at the reference point a, and the WiMAX network and the OAN broadband network are interconnected with the DSL network at the reference point V, which is described below in detail.

Figure 28:
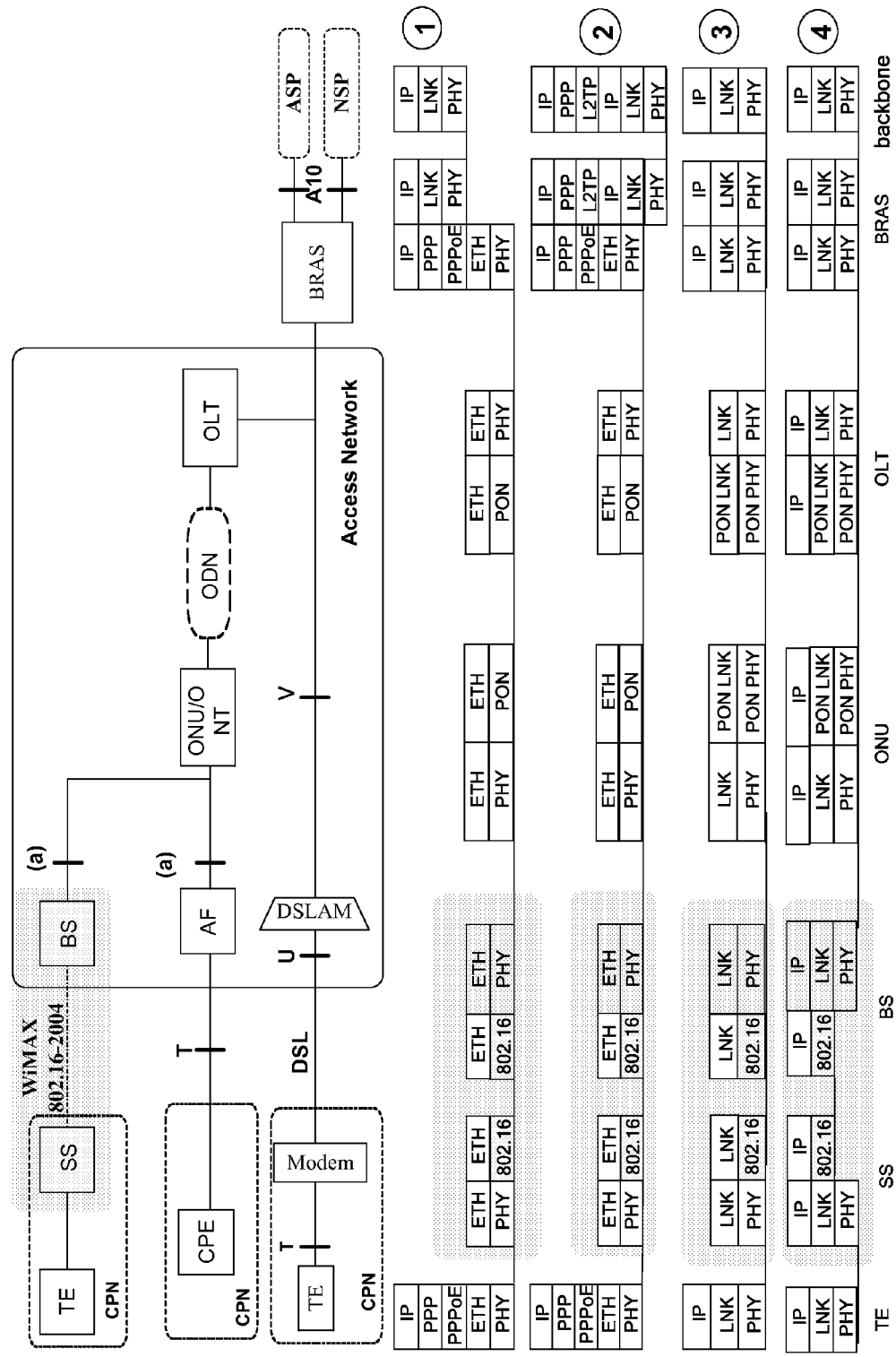
FIG. 28 is a schematic view of the WiMAX 802.16-2004 network interconnected with the OAN broadband network at the reference point a, and then interconnected with the DSL broadband network at the reference point V in the DSL broadband network.

The interconnection implementation for interconnecting the WiMAX 802.16-2004 network with the OAN broadband network at the reference point a, and interconnecting the WiMAX 802.16-2004 network and the OAN broadband network with the DSL broadband network at the reference point V in the DSL broadband network is shown in FIG. 28, which belongs to a tight-coupling solution. The WiMAX 802.16-2004 network directly utilizes the existing optical network resources of the OAN, thus avoiding the additional wiring for connecting to the BRAS, thereby reducing the construction cost of the WiMAX access network. In this solution, the BS is integrated with the function of AF. According to various WiMAX access modes, this interconnection solution includes two types of modes, and the protocol stacks thereof in a path of TE-SS-BS-ONU-OLT-BRAS-SP are respectively shown in FIG. 28. This path is an end-to-end path for interconnecting the WiMAX 802.16-2004 network, the DSL network, and the OAN network in this solution. This solution is mainly applicable for fixed access applications, but the WiMAX subscribers should have certain nomadic capabilities.

The first type of mode includes Mode 1, Mode 2, and Mode 3. In the path of TE-SS-BS-ONU-OLT-BRAS-SP, the 802.16-2004 Layer 2 wireless access technology is employed between the SS and the BS, and the BS accesses the ODN through the ONU and accesses the BRAS in the DSL network by utilizing the existing optical resources of the OAN. The Layer 2 wireless access technology supports the ETH CS at the airlink. In Mode 2, several SPs share the access network, and the BRAS accesses the SP through employing a tunneling technology, e.g., L2TP or MPLS tunneling. In Mode 1 and Mode 2, the PPP over Ethernet is supported between the BRAS and the TE to serve as a link protocol and as a mechanism for address allocation and authentication, provide a terminal configuration and ability of connection control and management. Mode 1 and Mode 2 are both applicable for pure data services.

The second type of mode includes Mode 4. In the path of TE-SS-BS-OLT-BRAS-SP, the TE, the SS, the BS, the ONU, the OLT and the BRAS are all Layer 3 network elements, the 802.16-2004 Layer 3 wireless access technology is employed between the SS and the BS, and the Layer 3 wireless access technology supports the IP CS at the airlink.

Figure 29:
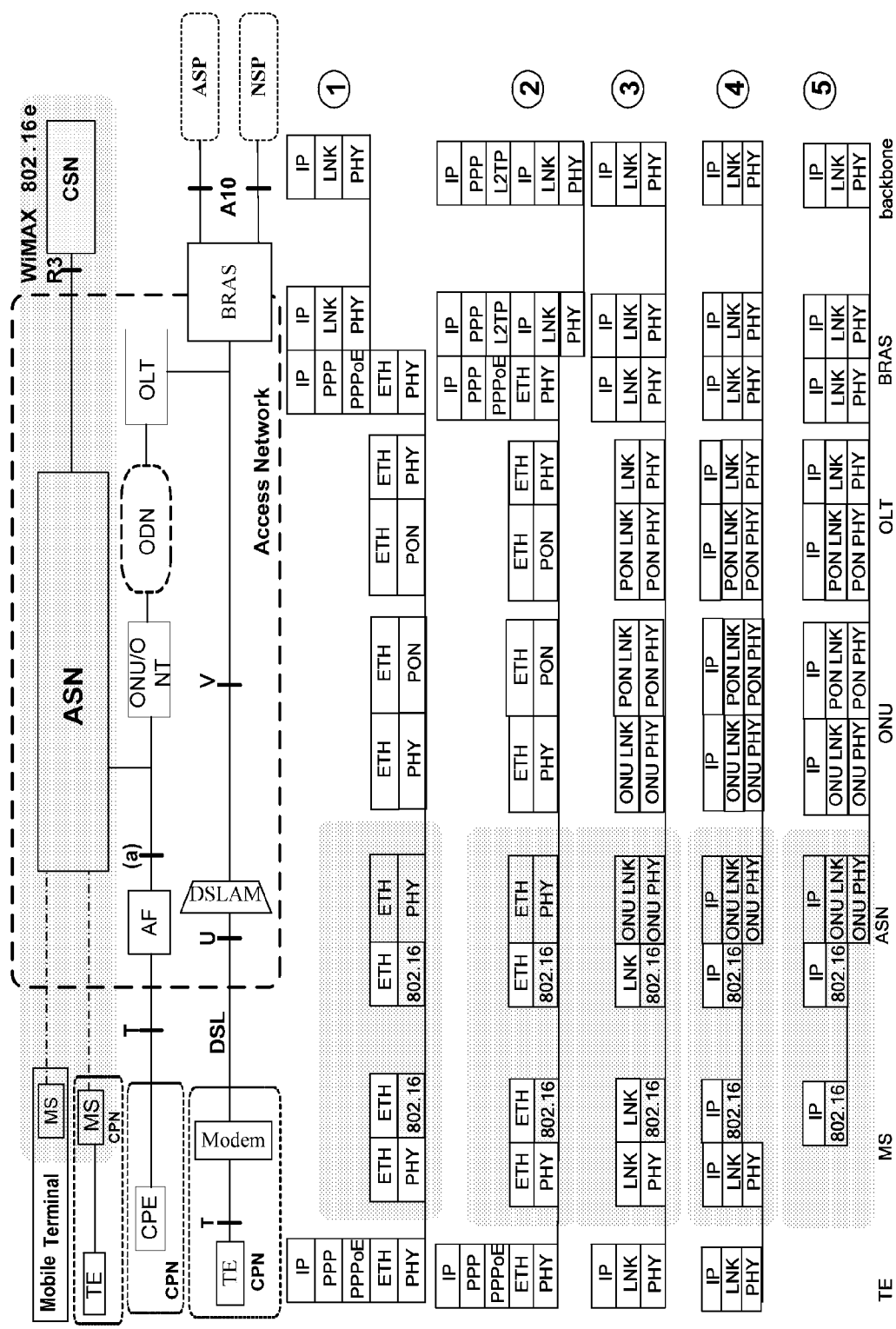
FIG. 29 is a schematic view of the WiMAX 802.16e network interconnected with the OAN broadband network at the reference point a, and then interconnected with the DSL broadband network at the reference point V in the DSL broadband network.

The interconnection implementation for interconnecting the WiMAX 802.16e network with the OAN broadband network at the reference point a, and then interconnecting the WiMAX 802.16e network and the OAN broadband network with the DSL broadband network at the reference point V in the DSL broadband network is shown in FIG. 29, which belongs to a loose-coupling solution. The WiMAX 802.16e network accesses the existing optical network resources of the OAN network through the ONU, thus avoiding the additional wiring for connecting to the BRAS, thereby reducing the construction cost of the WiMAX access network. The ASN is integrated with the function of AF. According to various WiMAX access modes, this interconnection solution includes three types of modes, and the protocol stacks thereof in a path of TE-MS-ASN-ONU-OLT-BRAS-SP are respectively shown in FIG. 29. This path is an end-to-end path for interconnecting the WiMAX 802.16e network, the DSL network, and the OAN network in this solution. This solution is mainly applicable for fixed access applications, and may also support portable and mobile access applications to a certain extent, thereby supporting uniform accounting, customer care, and authentication. The three types of modes in this solution are described herein below.

The first type of mode includes Mode 1, Mode 2, and Mode 3. In the path of TE-MS-ASN-ONU-OLT-BRAS-SP, the 802.16e Layer 2 wireless access technology is employed between the MS and the BS, and the BS accesses the ODN through the ONU and accesses the BRAS in the DSL network by utilizing the existing optical resources of the OAN. The Layer 2 wireless access technology supports the ETH CS at the airlink. In Mode 2, several SPs share the access network, and the BRAS accesses the SP through employing a tunneling technology, e.g., L2TP or MPLS tunneling. In Mode 1 and Mode 2, the PPP over Ethernet is supported between the BRAS and the TE to serve as a link protocol and as a mechanism for address allocation and authentication, provide a terminal configuration and ability of connection control and management. Mode 1 and Mode 2 are both applicable for pure data services.

The second type of mode includes Mode 4. In the path of TE-MS-ASN-ONU-OLT-BRAS-SP, the TE, the MS, the OLT, the ONU, all network elements of the ASN and the BRAS are all Layer 3 network elements, the 802.16e Layer 3 wireless access technology is employed between the MS and the BS, and the Layer 3 wireless access technology supports the IP CS at the airlink.

The third type of mode includes Mode 5. In the path of MS-BS-ASN-ONU-OLT-BRAS-SP, the Layer 3 routing technology, e.g. IP Layer 3 routing is employed between the BRAS and the MS. Herein, the Layer 3 routing technology indicates that all network elements of the ASN, the MS, the ONU, the OLT and the BRAS are all Layer 3 network elements, an access technology over the 802.16e Layer 3 wireless access technology is employed on the IP layer between the BS and the MS to replace wired access of the OAN and the DSL or to serve as a wireless extension of the wired access of the OAN and the DSL, and the access technology over the 802.16e Layer 3 wireless access technology supports the IP CS at the airlink.

III. The present invention further provides a second type of implementation solutions for interconnecting the BWA network with the OAN broadband network and a DSL network.

In this type of implementation solutions, the present invention further provides implementation solutions for interconnecting any two of the WiMAX network, the OAN network, and the DSL network at the reference point V in the DSL network through an interworking unit (IWU).

Figure 30:
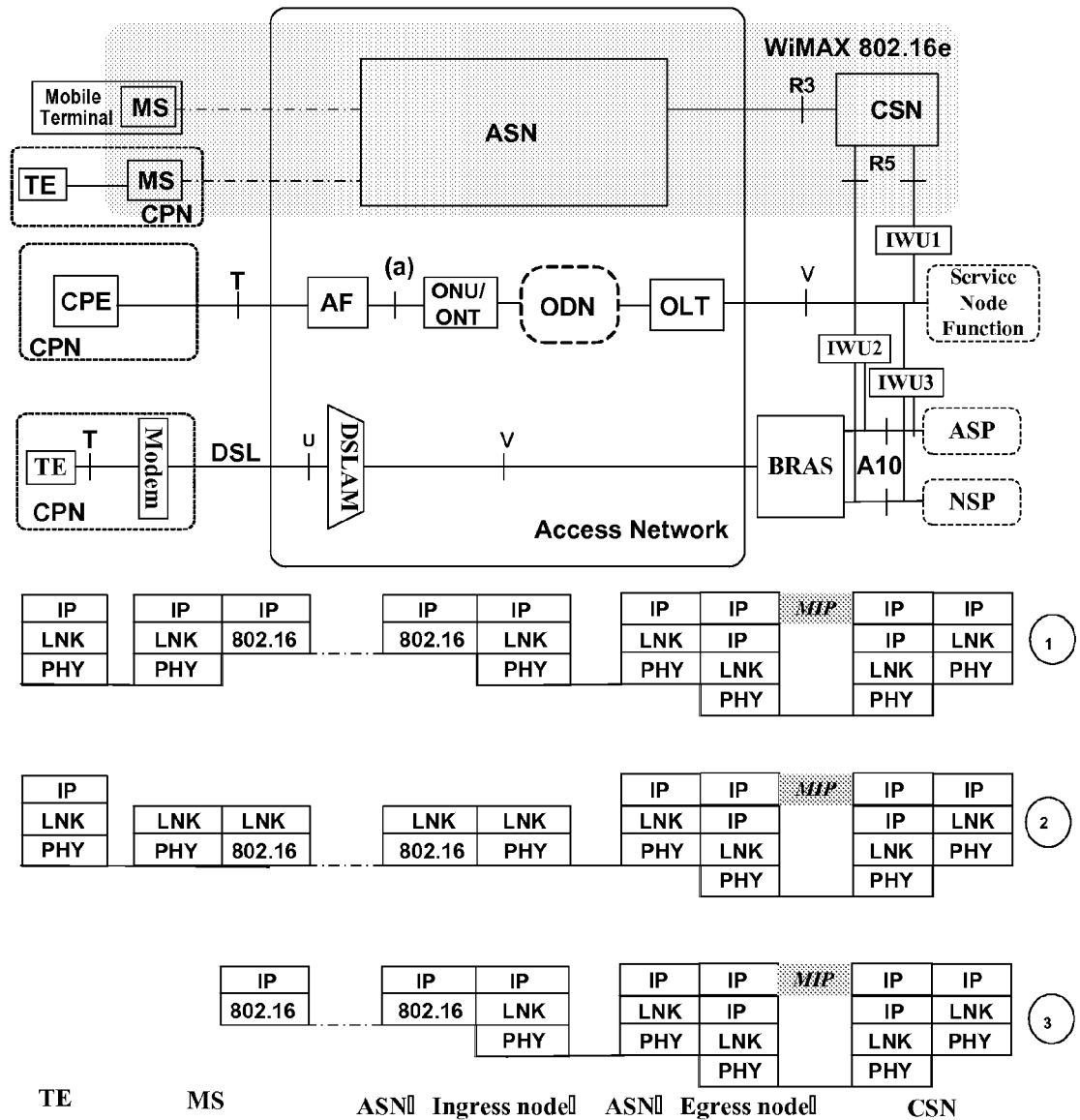
FIG. 30 is a schematic view of interconnecting any two of the WiMAX network, the OAN broadband network, and the DSL network through the IWUs according to the present invention.

The solution for interconnecting the BWA network with the wired network according to the present invention is first described below, that is, the solution for interconnecting the WiMAX network, the DSL network, and the OAN network. A schematic view of the implementation solution is shown in FIG. 30, which is described below in detail.

The operator possesses two independent networks, namely, the OAN network and the WiMAX 802.16e network, and a network element IWU1, i.e. a first network interworking unit, is added between the WiMAX 802.16e network and the OAN broadband network. The first network interworking unit IWU1 is adapted to realize protocol conversion from a reference point R5 to the reference point V, introduce the service provided by the SNF of the OAN broadband network to the WiMAX 802.16e network, or introduce the service provided by the CSN of the WiMAX 802.16e network to the OAN broadband network. Particularly, the first network interworking unit IWU1 is adapted to interconnect with the CSN of the WiMAX 802.16e network at the reference point R5 through at least one pair of wired cables, and interconnect with the SNF of the OAN broadband network at the reference point V through at least one pair of wired cables, perform the protocol conversion on the service provided by the SNF of the OAN broadband network and introduce the service to the WiMAX 802.16e network, and perform the protocol conversion on the service provided by the CSN of the WiMAX 802.16e network and introduce the service to the OAN broadband network.

A network element IWU2, i.e. a second network interworking unit, is added between the WiMAX 802.16e network and the DSL network. The second network interworking unit IWU2 is adapted to realize protocol conversion from the reference point R5 to a reference point A10, introduce the service provided by the SP of the DSL network to the WiMAX 802.16e network, or introduce the service provided by the CSN of the WiMAX 802.16e network to the DSL network. Particularly, the second network interworking unit IWU2 is adapted to interconnect with the CSN of the WiMAX 802.16e network at the reference point R5 through at least one pair of wired cables, and interconnect with the SP of the DSL network at the reference point A10 through at least one pair of wired cables, perform the protocol conversion on the service provided by the SP of the DSL network and introduce the service to the WiMAX 802.16e network, and perform the protocol conversion on the service provided by the CSN of the WiMAX 802.16e network and introduce the service to the DSL network.

A network element IWU3, i.e. a third network interworking unit, is added between the DSL network and a multi system operator (MSO) network. The third network interworking unit IWU3 is adapted to realize protocol conversion between the reference point A10 and the reference point V, introduce the service provided by the SNF of the OAN broadband network to the DSL network, or introduce the service provided by the SP of the DSL network to the OAN broadband network, so as to share the service provided by the SNF. Particularly, the third network interworking unit IWU3 is adapted to interconnect with the SP of the DSL network at the reference point A10 through at least one pair of wired cables, and interconnect with the SNF of the OAN broadband network at the reference point V through one or more pairs of wired cables, perform the protocol conversion on the service provided by the SNF of the OAN broadband network and introduce the service to the DSL network, and perform the protocol conversion on the service provided by the SP of the DSL network and introduce the service to the OAN broadband network.

This interconnection solution belongs to a loose-coupling solution. The IWU2 and IWU3 may be integrated with the DHCP relay, so as to access the DHCP server of the DSL network. The AAA protocol should be based on an EAP over RADIUS or EAP over DIAMETER. This solution includes three access modes, and the protocol stacks of the three modes in a path of TE-MS-ASN-CSN are respectively shown in FIG. 30. This path is an end-to-end path for interconnecting the WiMAX 802.16e network, the DSL network, and the OAN network in this solution. This solution is mainly applicable for portable and mobile access of the WiMAX, and is also applicable for the fixed access and nomadic properties, thereby supporting uniform authentication, accounting, and customer care. The three access modes in this solution are described herein below.

Mode 1: In the path from TE to CSN, the MS is attached with the TE, an IP Layer 3 routing technology is employed between the egress node of the ASN and the MS, and the IP Layer 3 routing technology supports an IP CS at an airlink.

Mode 2: In the path from TE to CSN, the MS is attached with the TE, a Layer 2 network bridging technology, e.g., Ethernet bridging technology, is employed between the egress node of the ASN and the MS, and the Layer 2 network bridging technology supports an ETH CS at the airlink.

Mode 3: In the path from TE to CSN, the MS may be simply a mobile terminal, the IP Layer 3 routing technology is employed between the ingress node of the ASN and the MS, and the IP Layer 3 routing technology supports the IP CS at the airlink.

The system for interconnecting a BWA network with a wired network of the present invention, i.e. the system for interconnecting the WiMAX network, the DSL network, and the OAN broadband network, includes three interconnection solutions.

In each solution, the network interworking unit includes a wired service processing unit and a protocol converting unit.

The wired service processing unit is adapted to connect to the WiMAX 802.16e network, the DSL network, and the OAN broadband network requiring interconnection at selected reference points through at least one pair of wired cables, transfer services of different protocols transferred from the WiMAX 802.16e network, the DSL network, and the OAN broadband network requiring interconnection to the protocol converting unit, and transfer services transferred from the protocol converting unit to the networks requiring interconnection. In a mode based on a Layer 3 routing, this unit performs the processing of wired data link layer; and in a mode based on a Layer 2 bridging, this unit performs the processing of wired data link layer and IP layer forwarding and provides a wired cable interface as an uplink interface.

The protocol converting unit is adapted to realize the conversion among different protocols, and exchange the services of different protocols from the WiMAX 802.16e network, the DSL network, and the OAN broadband network requiring interconnection with each wired service processing unit. In the mode based on the Layer 3 routing, the switching function of this unit is IP switching, and in the mode based on the Layer 2 bridging, the switching function of this unit is Layer 2 switching.

The three interconnection solutions are respectively introduced herein below.

Figure 31:
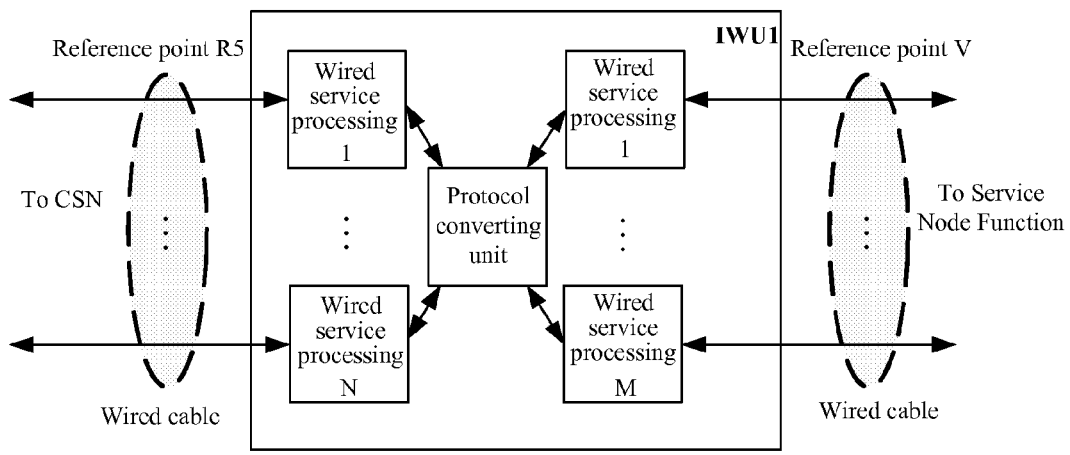
FIG. 31 is a schematic view of the system for interconnecting the WiMAX network with the OAN broadband network through the IWU1.

Solution 1: FIG. 31 is a schematic view of a system for interconnecting the WiMAX 802.16e network with the OAN broadband network through the IWU1, which is described below in detail.

The IWU1 interconnects with the CSN of the WiMAX 802.16e network at the reference point R5 through one or more pairs of wired cables, and interconnects with the SNF of the OAN broadband network at the reference point V through one or more pairs of wired cables.

The IWU1 includes a protocol converting unit and one or more wired service processing units. The protocol converting unit is adapted to perform protocol conversion between the reference point R5 and the reference point V, introduce the services provided by the SNF of the OAN broadband network to the WiMAX 802.16e network, or introduce the services provided by the CSN of the WiMAX 802.16e network to the OAN broadband network.

Solution 2: FIG. 32 is a schematic view of a system for interconnecting the WiMAX 802.16e network with the DSL network through the IWU2, which is described below in detail.

The IWU2 interconnects with the CSN of the WiMAX 802.16e network at the reference point R5 through one or more pairs of wired cables, and interconnects with the SP of the DSL network at the reference point A10 through one or more pairs of wired cables.

The IWU2 includes a protocol converting unit and one or more wired service processing units. The protocol converting unit is adapted to perform protocol conversion between the reference point R5 and the reference point A10, introduce the services provided by the SP of the DSL network to the WiMAX 802.16e network, or introduce the services provided by the CSN of the WiMAX 802.16e network to the DSL network.

Solution 3: FIG. 33 is a schematic view of a system for interconnecting the DSL network with the OAN broadband network through the IWU3, which is described below in detail.

The IWU3 interconnects with the SP of the DSL network at the reference point A10 through one or more pairs of wired cables, and interconnects with the SNF of the OAN broadband network at the reference point V through one or more pairs of wired cables.

The IWU3 includes a protocol converting unit and one or more wired service processing units. The protocol converting unit is adapted to perform protocol conversion between the reference point A10 and the reference point V, introduce the services provided by the SNF of the OAN broadband network to the DSL network, or introduce the services provided by the SP of the DSL network to the OAN broadband network.

In the above three interconnection solutions, in the mode based on the Layer 3 routing, the switching function of the protocol converting unit is IP switching, which includes all protocol functions provided on the IP layer or over the IP layer (e.g., providing DHCP Relay service, AAA Broker service); and the wired service processing units perform the processing of wired data link layer (e.g., Ethernet MAC layer), and provide a wired cable (e.g., Ethernet cable) interface as an uplink interface to access the SNF.

In the mode based on the Layer 2 bridging, the switching function of the protocol converting unit is Layer 2 switching (e.g., Ethernet switching); and the wired service processing units perform the processing of wired data link layer (e.g., Ethernet MAC layer) and the IP layer forwarding and provide a wired cable (e.g., Ethernet cable) interface as an uplink interface to access the SNF.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for interconnecting a broadband wireless access (BWA) network with a wired network, the wired network comprising an optical access network (OAN) broadband network, the method comprising:

interconnecting the BWA network with the OAN broadband network at a selected reference point in the OAN broadband network, wherein the reference point is any one selected from a group consisting of a reference point T, a reference point a, a reference point optical distribution network (ODN) and a reference point V;

wherein the reference point T is a reference point of a user network interface (UNI) in the OAN broadband network, the reference point a is a reference point of an interface between an adaptation function (AF) and an optical network unit (ONU) in the OAN broadband network, the reference point ODN is a reference point of an ODN interface in the OAN broadband network, and the reference point V is a reference point of a service node interface (SNI) in the OAN broadband network;

wherein the wired network further comprises a digital subscriber line (DSL) network, and the method further comprises:

interconnecting the DSL network with the BWA network at the reference point V in the OAN broadband network;

wherein the BWA network comprises a WiMAX network comprising a base station (BS), the WiMAX network is interconnected with the OAN broadband network by directly connecting the BS of the WiMAX network with the reference point ODN in the OAN broadband network, and the BS is interconnected with a Broadband Remote Access Server (BRAS) of the DSL network through existing optical fiber resources of the OAN network;

wherein the BWA network and the OAN broadband network are interconnected with each other through a first interworking unit (IWU); the BWA network and the DSL network are interconnected with each other through a second IWU; and the OAN network and the DSL network are interconnected with each other through a third IWU;

wherein the first IWU is connected between a reference point R5 in the WiMAX 802.16e network and the reference point V in the OAN broadband network, wherein the first IWU is configured for performing protocol conversion from the reference point R5 to the reference point V, and exchanging services between the WiMAX 802.16e network and the OAN broadband network;

the second IWU is connected between the reference point R5 in the WiMAX 802.16e network and a reference point A10 in the DSL network, wherein the second IWU is configured for performing protocol conversion from the reference point R5 to the reference point A10, and exchanging the services between the WiMAX 802.16e network and the DSL network; and the third IWU is connected between the reference point A10 in the DSL network and the reference point V in the OAN broadband network, wherein the third IWU is configured for performing protocol conversion from the reference point A10 to the reference point V, and exchanging the services between the DSL network and the OAN broadband network;

wherein the reference point R5 is a reference point at a connection service network (CSN), and the reference point A10 is a reference point between the DSL network and a service provider (SP).

2. The method according to claim 1, further comprising: employing, in a path from a terminal equipment (TE) to the CSN, Layer 2 bridging between an egress node of an access service network (ASN) and a mobile station (MS) attached with the TE.

3. The method according to claim 1, further comprising: employing IP Layer 3 routing between the egress node of the ASN and the MS; and employing, in a path from a terminal equipment (TE) to the CSN, Layer 3 routing mode between an egress node of an access service network (ASN) and a mobile station (MS) attached with the TE.

* * * * *